US012488754B2

(12) United States Patent
Zhong

(10) Patent No.: US 12,488,754 B2
(45) Date of Patent: Dec. 2, 2025

(54) VOLTAGE REGULATION METHOD, TERMINAL DEVICE, CHIP, AND STORAGE MEDIUM

(71) Applicant: HONOR DEVICE CO., LTD., Shenzhen (CN)

(72) Inventor: Guanghua Zhong, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/836,251

(22) PCT Filed: Sep. 8, 2023

(86) PCT No.: PCT/CN2023/117799
§ 371 (c)(1),
(2) Date: Aug. 6, 2024

(87) PCT Pub. No.: WO2024/067026
PCT Pub. Date: Apr. 4, 2024

(65) Prior Publication Data

US 2025/0118256 A1 Apr. 10, 2025

(30) Foreign Application Priority Data

Sep. 29, 2022 (CN) ......................... 202211203438.0

(51) Int. Cl.
*G09G 3/3233* (2016.01)

(52) U.S. Cl.
CPC ... *G09G 3/3233* (2013.01); *G09G 2300/0842* (2013.01); *G09G 2320/0233* (2013.01); *G09G 2330/021* (2013.01); *G09G 2360/16* (2013.01)

(58) Field of Classification Search
CPC ......... G09G 3/3233; G09G 2300/0842; G09G 2320/0233; G09G 2330/021;
(Continued)

(56) References Cited

U.S. PATENT DOCUMENTS

| | | |
|---|---|---|
| 7,379,081 B2 | 5/2008 | Park et al. |
| 9,013,466 B2 | 4/2015 | Chien et al. |

(Continued)

FOREIGN PATENT DOCUMENTS

| | | |
|---|---|---|
| CN | 1848218 A | 10/2006 |
| CN | 102203845 A | 9/2011 |

(Continued)

OTHER PUBLICATIONS

EP Communication Pursuant to Article 94(3) EPC in European Appln. No. 23870265.8, mailed on Sep. 24, 2025, 9 pages.

*Primary Examiner* — Rodney Amadiz
(74) *Attorney, Agent, or Firm* — Fish & Richardson P.C.

(57) ABSTRACT

This application provides a voltage regulation method, a terminal device, a chip, and a storage medium, relates to the field of display technologies, and can alleviate a problem of high power consumption of a display driver circuit in the terminal device. The voltage regulation method includes: obtaining highest gray scales of color channels of a to-be-displayed image; determining lowest working voltages required for the display driver circuit to display the highest gray scales of the color channels, to regulate a working voltages of a display circuit based on displayed content; and
(Continued)

determining a maximum value of the lowest working voltages required for the display driver circuit to display the highest gray scales of the color channels as a target working voltage of the display driver circuit.

18 Claims, 10 Drawing Sheets

(58) Field of Classification Search
CPC ......... G09G 2360/16; G09G 2330/028; G09G 3/32; G09G 3/3208; G09G 3/36; G09G 3/20
See application file for complete search history.

(56) References Cited

U.S. PATENT DOCUMENTS

| | | | | |
|---|---|---|---|---|
| 9,058,772 | B2 | 6/2015 | Ebisuno | |
| 9,542,877 | B2 | 1/2017 | Park et al. | |
| 9,613,569 | B2 | 4/2017 | Yin | |
| 2011/0221784 | A1 | 9/2011 | Lee | |
| 2014/0132588 | A1* | 5/2014 | Hsu .......................... | G09G 3/36 345/212 |
| 2015/0049070 | A1 | 2/2015 | Ren et al. | |
| 2016/0180763 | A1 | 6/2016 | Park et al. | |
| 2017/0278448 | A1* | 9/2017 | Zhang .................. | G09G 3/2074 |
| 2021/0065623 | A1 | 3/2021 | Hong et al. | |

FOREIGN PATENT DOCUMENTS

| | | | |
|---|---|---|---|
| CN | 103177693 | A | 6/2013 |
| CN | 103680391 | A | 3/2014 |
| CN | 103971634 | A | 8/2014 |
| CN | 105719597 | A | 6/2016 |
| CN | 104200785 | B | 8/2016 |
| CN | 106847178 | A | 6/2017 |
| CN | 110197641 | A | 9/2019 |
| CN | 113889035 | A | 1/2022 |
| CN | 114743471 | A | 7/2022 |
| JP | 2006146024 | A | 6/2006 |
| JP | 2009069485 | A | 4/2009 |
| JP | 2011123213 | A | 6/2011 |
| JP | 2011123214 | A | 6/2011 |
| KR | 20100083933 | A | 7/2010 |

* cited by examiner

VOLTAGE REGULATION METHOD, TERMINAL DEVICE, CHIP, AND STORAGE MEDIUM

CROSS-REFERENCE TO RELATED APPLICATIONS

This application is a national stage of International Application No. PCT/CN2023/117799, filed on Sep. 8, 2023, which claims priority to Chinese Patent Application No. 202211203438.0, filed on Sep. 29, 2022. The disclosures of both of the aforementioned applications are hereby incorporated by reference in their entireties.

TECHNICAL FIELD

This application relates to the field of display technologies, and in particular, to a voltage regulation method, a terminal device, a chip, and a storage medium.

BACKGROUND

A display or a display screen is an output device that converts an electrical signal into an image signal, and is an important part of an electronic device, such as a computer, a mobile phone, and a television. The widely used displays at present are respectively a liquid crystal display (liquid crystal display, LCD) and an organic light-emitting diode (organic light-emitting diode, OLED). Display principles of these two types of displays are based on an optical principle of combining a plurality of primary colors into a pixel. For example, each pixel includes three sub-pixels: red (red, R), green (green, G), and blue (blue, B), RGB for short, or includes sub-pixels, such as red (red, R), green (green, G), blue (blue, B), and white (white, W), RGBW for short. Different sub-pixels display different brightness or gray scales, and a pixel displays different colors after a plurality of primary colors are combined.

Using the OLED as an example, a light-emitting unit of the OLED displays different gray scales under different drive currents. A greater current of a drive signal indicates a greater displayed gray scale. A less current of the drive signal indicates a less displayed gray scale. Therefore, the gray scales displayed by the light-emitting unit of each color may be regulated by controlling a current magnitude of the drive signal of the light-emitting unit or regulating a duty cycle of the drive signal.

Currently, a display assembly usually works in a fixed voltage mode. To be specific, a driving transistor and a light-emitting component are connected in series to a power supply with a fixed voltage difference. However, content displayed by the light-emitting unit of the OLED or another light-emitting unit changes dynamically, and not all display images have a brightest gray scale. Therefore, the display assembly has high power consumption when working in the fixed voltage mode.

SUMMARY

In view of this, this application provides a voltage regulation method, a terminal device, a chip, and a storage medium, and is used for alleviating a problem of high power consumption caused by a display driver circuit of the terminal device working in a fixed voltage mode.

According to a first aspect, this application provides a voltage regulation method that is applied to a processor of a terminal device. The terminal device further includes a display assembly, and the display assembly includes a display driver circuit. The method includes: obtaining highest gray scales of color channels of a to-be-displayed image, where for example, if the image is displayed by the display driver circuit in an RGB mode, highest gray scales of three channels of red, green, and blue are obtained; and if the image is displayed by the display driver circuit in an RGBW mode, highest gray scales of four channels of red, green, blue, and white are obtained; determining lowest working voltages required for the display driver circuit to display the highest gray scales of the color channels, where a working voltage of the display driver circuit mainly includes a divided voltage of a driving transistor and a divided voltage of a light-emitting component; when a highest gray scale is displayed, the divided voltage of the light-emitting component reaches a highest state, and the divided voltage of the driving transistor reaches a lowest state; and because the driving transistor works in a saturation region, a sum of a lowest saturation voltage of the driving transistor in the saturation region and the divided voltage of the light-emitting component is used as the lowest working voltage of the display driver circuit when the divided voltage of the light-emitting component reaches the highest state, so that it can be ensured that all gray scales can be displayed normally; and determining a maximum value of the lowest working voltages required for the display driver circuit to display the highest gray scales of the color channels as a target working voltage of the display driver circuit. In this way, it may be ensured that all gray scales of different color channels of the to-be-displayed image can be displayed normally, and power consumption of the display driver circuit can be further reduced when a gray scale of the to-be-displayed image is lower than a highest gray scale of the light-emitting component.

In a possible implementation, the display driver circuit includes a driving transistor and a light-emitting component, and the driving transistor is configured to provide a drive current for the light-emitting component. That the determining lowest working voltages required for the display driver circuit to display the highest gray scales of the color channels includes: determining, based on a pre-stored correspondence between a gray scale of the light-emitting component with each color channel and the drive current as well as a correspondence between the drive current and a drive voltage, drive currents and drive voltages that are required for the light-emitting component to display the highest gray scales of the color channels; determining, based on a pre-stored correspondence between a current and a voltage of the driving transistor, a lowest saturation voltage when the driving transistor outputs the drive current; and determining a sum of the drive voltages required for the light-emitting component to display the highest gray scales of the color channels and the lowest saturation voltage as the lowest working voltages required for displaying the highest gray scales of the channels. The working voltage of the display driver circuit mainly includes the divided voltage of the driving transistor and the divided voltage of the light-emitting component. The driving transistor works in the saturation region, and an output current does not change with a change of the divided voltage. When the light-emitting component displays a highest gray scale of a specific color channel, a drive voltage of the light-emitting component reaches the maximum. A sum of the drive voltage at this time and a lowest voltage of the driving transistor working in the saturation region when the drive voltage of the light-emitting component reaches the maximum is used as a lowest working voltage. In the lowest working voltage, it may be ensured that the light-emitting component can display any gray scale of this color channel.

In a possible implementation, that the determining, based on a pre-stored correspondence between a current and a voltage of the driving transistor, a lowest saturation voltage when the driving transistor outputs the drive current includes: determining, based on the pre-stored correspondence between the current and the voltage of the driving transistor, when the driving transistor works in a saturation region, a lowest voltage corresponding to an output current that is the drive current as the lowest saturation voltage of the driving transistor.

In a possible implementation, the voltage regulation method further includes: sending a control instruction to the display assembly to enable the display assembly to adjust a working voltage of the display driver circuit to the target working voltage.

In a possible implementation, the control instruction includes a voltage adjustment value. The voltage adjustment value is a difference between an input voltage of the display driver circuit and the target working voltage. Alternatively, the control instruction includes the target working voltage.

In a possible implementation, the voltage regulation method further includes: determining a current variation of the driving transistor based on the voltage adjustment value and the pre-stored correspondence between the current and the voltage of the driving transistor, where the voltage adjustment value is a difference between an input voltage of the display driver circuit and the target working voltage; determining a brightness compensation amount based on the current variation; and sending the brightness compensation amount to the display assembly. Because the driving transistor may not reach an ideal state, when the working voltage of the display driver circuit is adjusted, a voltage of the driving transistor is reduced to the lowest saturation voltage. This may cause a saturation current outputted by the driving transistor to be reduced. In other words, a drive current in a light-emitting range is decreased to cause a gray scale displayed by the light-emitting component to be reduced. Therefore, brightness of the light-emitting component is compensated based on the current variation of the driving transistor to avoid reduction in the displayed gray scale because the driving transistor does not reach the ideal state.

In a possible implementation, that the obtaining highest gray scales of color channels of a to-be-displayed image includes: obtaining gray scales of color channels of each pixel in the to-be-displayed image; and using a maximum value of gray scales of a same color channel of all pixels in the to-be-displayed image as a highest gray scale of this channel.

According to a second aspect, an embodiment of this application provides a terminal device, including: a display assembly and one or more processors. The processors are connected to the display assembly, and the display assembly includes a display driver circuit. The processors are configured to execute computer program instructions to implement the voltage regulation method according to any one of implementations in the first aspect.

According to a third aspect, an embodiment of this application provides a chip. The chip is used in a terminal device and includes one or more processors. The processors are configured to execute computer program instructions to enable the terminal device to perform the voltage regulation method according to any one of implementations in the first aspect.

According to a fourth aspect, an embodiment of this application provides a computer-readable storage medium. The computer-readable storage medium has a computer program stored thereon. When the computer program is executed by a processor, a terminal device is enabled to perform the voltage regulation method according to any one of implementations in the first aspect.

DESCRIPTION OF EMBODIMENTS

Embodiments of this application are applied to a terminal device 100. The terminal device 100 provided in embodiments of this application may be a mobile phone, a smart screen, a tablet computer, a wearable electronic device, an in-vehicle infotainment, an augmented reality (augmented reality, AR) device, a virtual reality (virtual reality, VR) device, a notebook computer, a personal digital assistant (personal digital assistant, PDA), a projector, or the like. A specific type of the terminal device 100 is not limited in embodiments of this application.

Figure 1:
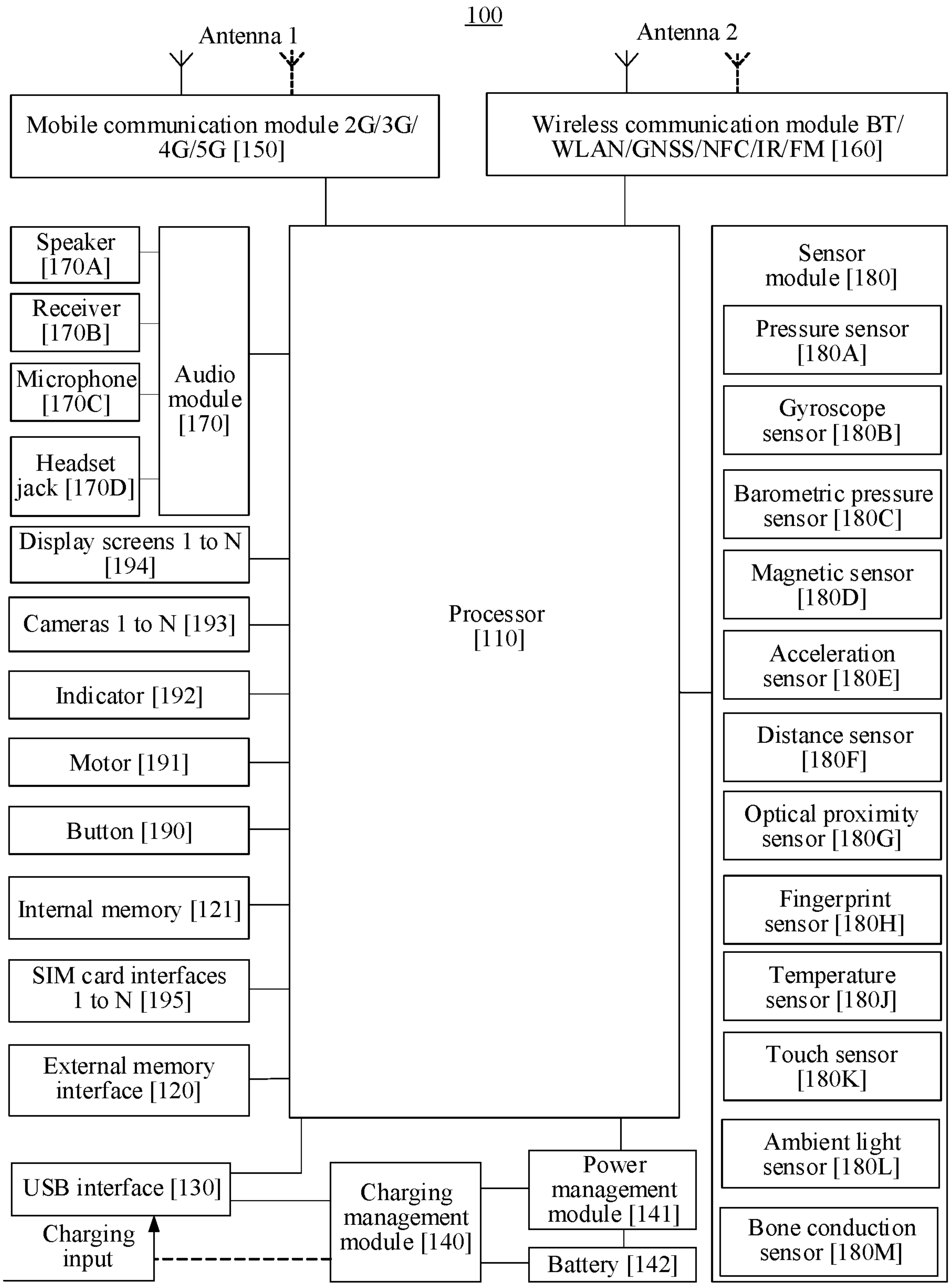
FIG. 1 is a schematic diagram of a structure of a terminal device according to an embodiment of this application.

The following describes, by using an example in which the terminal device is a mobile phone, a schematic diagram of a structure of the terminal device 100 to which embodiments of this application are applied. Refer to FIG. 1. The terminal device 100 may include: a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like.

The sensor module 180 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that the structure illustrated in this embodiment does not constitute a specific limitation to the terminal device 100. In some other embodiments, the terminal device 100 may include more or fewer components than those shown in the figure, some components may be combined, some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate components, or may be integrated into one or more processors.

The controller may be a nerve center and a command center of the terminal device 100. The controller may generate an operation control signal based on instruction operation code and a timing signal, to control instruction fetching and instruction execution.

A memory may be further disposed in the processor 110 and is configured to store instructions and data. In some embodiments, the memory in the processor 110 is a cache. The memory may store instructions or data recently used or cyclically used by the processor 110. If the processor 110 needs to use the instructions or the data again, the instructions or the data from the memory may be directly invoked. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules shown in this embodiment is merely an example for description, and does not constitute a limitation on the structure of the terminal device 100. In some other embodiments, the terminal device 100 may alternatively use an interface connection manner different from that in the foregoing embodiment, or use a combination of a plurality of interface connection manners.

The charging management module 140 is configured to receive charging input from a charger. The charger may be a wireless charger or a wired charger. When charging the battery 142, the charging management module 140 may further supply power to the terminal device by using the power management module 141.

The power management module 141 is configured to be connected to the battery 142, the charging management module 140, and the processor 110. The power management module 141 receives input from the battery 142 and/or the charging management module 140, and supplies power to the processor 110, the internal memory 121, an external memory, the display screen 194, the camera 193, the wireless communication module 160, and the like. In some embodiments, the power management module 141 and the charging management module 140 may alternatively be disposed in a same component.

A wireless communication function of the terminal device 100 may be implemented by using the antenna 1, the antenna 2, the mobile communication module 150, the wireless communication module 160, the modem processor, the baseband processor, and the like. In some embodiments, in the terminal device 100, the antenna 1 is coupled to the mobile communication module 150, and the antenna 2 is coupled to the wireless communication module 160, so that the terminal device 100 may communicate with a network and another device by using a wireless communication technology.

The antenna 1 and the antenna 2 are configured to transmit and receive electromagnetic wave signals. Each antenna in the terminal device 100 may be configured to cover one or more communication frequency bands. Different antennas may also be multiplexed to improve antenna utilization. For example, the antenna 1 may be multiplexed into a diversity antenna of a wireless local area network. In some other embodiments, the antenna may be used in combination with a tuning switch.

The mobile communication module 150 may provide a wireless communication solution that is applied to the terminal device 100 and that includes 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation.

The mobile communication module 150 may further amplify a signal obtained after modulation by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same component as at least some modules of the processor 110.

The wireless communication module 160 may provide a solution for wireless communication solution that is applied to the terminal device 100 and that includes a WLAN (for example, a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like.

The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the to-be-sent signal, and convert the to-be-sent signal into an electromagnetic wave for radiation through the antenna 2.

The terminal device 100 implements a display function by using the GPU, the display screen 194, the application processor, and the like. The GPU is a microprocessor for image processing and is connected to the display screen 194 and the application processor. The GPU is configured to perform mathematical and geometric calculation for graphics rendering. The processor 110 may include one or more GPUs that execute program instructions to generate or change display information.

The display screen 194 is configured to display an image, a video, and the like. The display screen 194 includes a display panel and a print circuit board (print circuit board, PCB). A display driver circuit is provided on the PCB. The processor 110 may send data of a to-be-displayed image to the display screen. The display driver circuit drives the data of the image to be displayed on the display panel.

In this embodiment of this application, the display panel may use an organic light emitting diode (organic light emitting diode, LED), an active matrix organic light emitting diode (active matrix organic light emitting diode, AMOLED), a micro LED (micro light emitting diode, Micro LED), or the like. In some possible implementation, the terminal device 100 may include one or more display screens 194. The display screen 194 may communicate with the processor 110 by a display serial interface (display serial interface, DIS) to implement the display function of the terminal device 100.

The terminal device 100 may implement a photographing function by using the ISP, the camera 193, the video codec, the GPU, the display screen 194, the application processor, and the like. The ISP is configured to process data fed back by the camera 193. The camera 193 is configured to capture a still image or a video. In some embodiments, the terminal device 100 may include one or N cameras 193, and N is a positive integer greater than 1.

The external memory interface 120 may be configured to be connected to an external storage card, for example, a Micro SD card, to expand a storage capacity of the terminal device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to implement various functional applications and data processing of the terminal device 100. For example, in this embodiment of this application, the processor 110 may execute the instructions stored in the internal memory 121, and the internal memory 121 may include a program storage region and a data storage region.

The program storage region may store an operating system, an application required by at least one function (such as a voice playing function and an image playing function), and the like. The data storage region may store data (such as audio data and an address book) created during use of the terminal device 100, and the like. In addition, the internal memory 121 may include a high-speed random access memory, and may further include a non-volatile memory, for example, at least one magnetic disk storage device, a flash memory device, or a universal flash storage (universal flash storage, UFS).

The terminal device 100 may implement an audio function such as music playing or recording by using the audio module 170, the speaker 170A, the receiver 170B, the microphone 170C, the headset jack 170D, the application processor, and the like.

The button 190 includes a power button, a volume button, and the like. The button 190 may be a mechanical button or a touch button. The motor 191 may generate a vibration prompt. The motor 191 may be configured to provide an incoming call vibration prompt or a touch vibration feedback. The indicator 192 may be an indicator light, and may be configured to indicate a charging status or a power change, or may be further configured to indicate a message, a missed call, a notification, and the like. The SIM card interface 195 is configured to connect to a SIM card. The SIM card may be inserted into the SIM card interface 195 or removed from the SIM card interface 195, to be in contact with and be separated from the terminal device 100. The terminal device 100 may support 1 or N SIM card interfaces, and N is a positive integer greater than 1. The SIM card interface 195 may support a Nano SIM card, a Micro SIM card, a SIM card, and the like.

It should be noted that the structure shown in FIG. 1 does not constitute a specific limitation on the terminal device 100. In some other implementations of this application, the terminal device 100 may include more or fewer components than those shown in FIG. 1, or the terminal device 100 may include a combination of some of the components shown in FIG. 1, or the terminal device 100 may include subcomponents of some of the components shown in FIG. 1. The components shown in FIG. 1 may be implemented by hardware, software, or a combination of software and hardware.

The most widely used displays at present are respectively a liquid crystal display (liquid crystal display, LCD) and an organic light-emitting diode (organic light-emitting diode, OLED). Display principles of these two types of displays are based on an optical principle of combining three primary colors into a pixel. In normal cases, each pixel includes three sub-pixels: red, green, and blue. This display principle is referred to as a red, green, and blue (red, green, and blue, RGB) mode. Each sub-pixel may display an adjustable gray scale, a combination of three primary colors with different gray scale brightness may form a plurality of different colors. A gray scale refers to dividing brightness changes between a brightest color and a darkest color that can be displayed in red, green, and blue into several parts, to facilitate screen brightness adjustment corresponding to signal input. For example, if a gray scale range of three sub-pixels of red, green, and blue is 0 to 255, a combined color of the three colors displayed by the pixel is yellow when both gray scales displayed by a red sub-pixel and a green sub-pixel of a specific pixel are 15, and a gray scale displayed by the blue sub-pixel is 0.

In some other implementations, the display can alternatively display an image in a red, green, blue, and white (red, green, blue, and white, RGBW) mode. Principles of the RGBW mode and the RBG mode are the same. Different gray scale light is displayed by red, green, and blue sub-pixels or red, green, blue, and white sub-pixels of each pixel, and different colors are displayed after combining. In this embodiment of this application, the RGB mode is used as an example for description.

The LCD itself cannot emit light but display by emitting light from a backlight layer, while the OLED itself can emit light. Each pixel includes three light-emitting components of red, green, and blue. The light-emitting components emit light when being energized, and do not emit light when being not energized. Therefore, if there is no light leakage, pure black may be displayed. In addition, a greater current that is energized indicates higher brightness of the light-emitting components. A smaller current that is energized indicates lower brightness of the light-emitting components. A color ratio of red, green, and blue sub-pixels may be controlled by controlling a voltage or current applied to each light-emitting component, to control a color of each pixel.

Because the LCD has the backlight layer, and all pixels share a same backlight layer, an entire screen always lights up together when the backlight layer is turned on, and turns off when the backlight layer is turned off. However, the OLED does not have a backlight layer, and each pixel is controlled independently. Therefore, there is no need to light up or turn off all the pixels on the entire screen like the LCD, but a part of the pixels may be selected to light up, and remaining pixels may be turned off without power, so that the OLED has lower power consumption than that of the LCD.

A driving manner of the OLED may be classified into a passive driving manner and an active driving manner. An active driving OLED has an active matrix organic light emitting diode (active matrix organic light emitting diode, AMOLED) panel. The AMOLED can emit light by generating a drive current by a driving transistor in a saturation state. The drive current drives the OLED to emit light.

Figure 2:
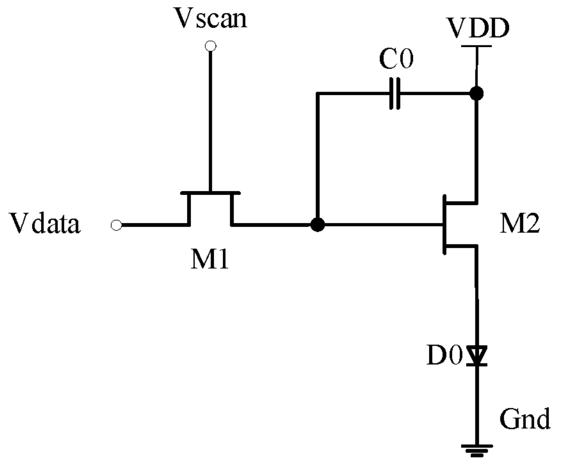
FIG. 2 is a circuit diagram of a display driver circuit according to an embodiment of this application.
Figure 3:
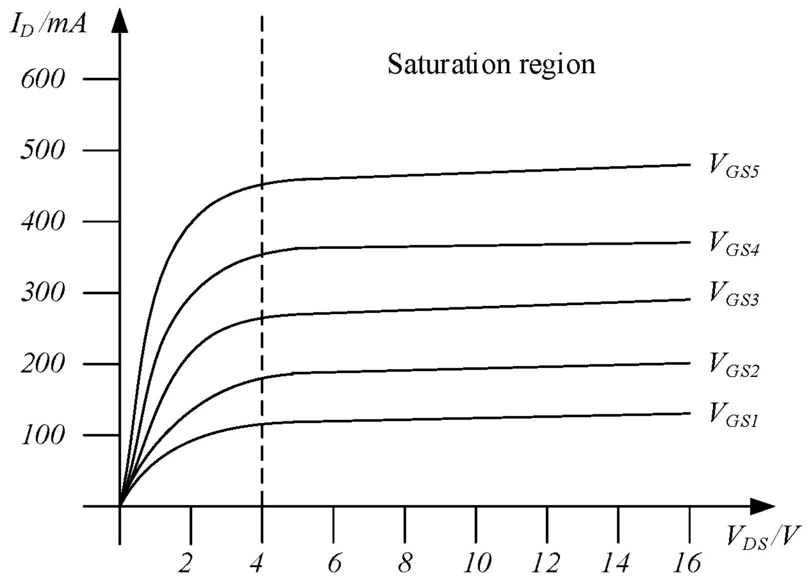
FIG. 3 is a schematic diagram of a relationship between a current and a voltage of a driving transistor according to an embodiment of this application.

FIG. 2 shows a display driver circuit according to an embodiment of this application, including a transistor M1, a transistor M2, a capacitor C0, and a light-emitting component D0. A gate of the transistor M1 is used for receiving a scanning signal Vscan. A source of the transistor M1 is used for receiving a data signal Vdata. A drain of the transistor M1 is connected to a gate of the transistor M2. In addition, the gate of the transistor M2 is connected to one end of the capacitor C0. A source of the transistor M2 is connected to the other end of the capacitor C0. A drain of the transistor M2 is connected to an anode of the light-emitting component D0, and a cathode of the light-emitting component D0 is grounded. The transistor M1 is turned on when the gate is accessed by the scanning signal Vscan, and the data signal Vdata is introduced from the source of the transistor M1. The transistor M2 generally works in a saturation region. FIG. 3 shows a current-voltage relationship curve of the transistor M2. For the transistor M2 working in the saturation region, a current flowing through the source and the drain does not change with a change of a voltage $V_{DS}$ of the drain and the source, but is determined by a gate source voltage $V_{GS}$. Therefore, the transistor M2 may provide a stable drive current for the light-emitting component D0, and the transistor M2 is generally referred to as a driving transistor.

$V_{GS}$=Vdata−VD0. VD0 is a turn-on voltage of the light-emitting component D0. VDD is a regulated power supply that is connected to the source of the transistor M2 and that is configured to provide energy required for the light-emitting component D0 to emit light. A function of the capacitor C0 is to maintain stability of a gate voltage of the transistor M2 in a display period of a frame image.

In the display driver circuit shown in FIG. 2, because VDD is the regulated power supply, the transistor M2 works in the saturation region. When $V_{GS}$ increases, a saturation current ID flowing through the source and the drain of the transistor M2 increases, a current of light-emitting component D0 increases, and a displayed gray scale increases. When $V_{GS}$ decreases, the saturation current ID flowing through the source and the drain of the transistor M2 decreases, the current of light-emitting component D0 decreases, and the displayed gray scale decreases. Therefore, different $V_{GS}$ drive the transistor M2 to output different saturation currents, so that the light-emitting component D0 has different brightness.

Figure 4:
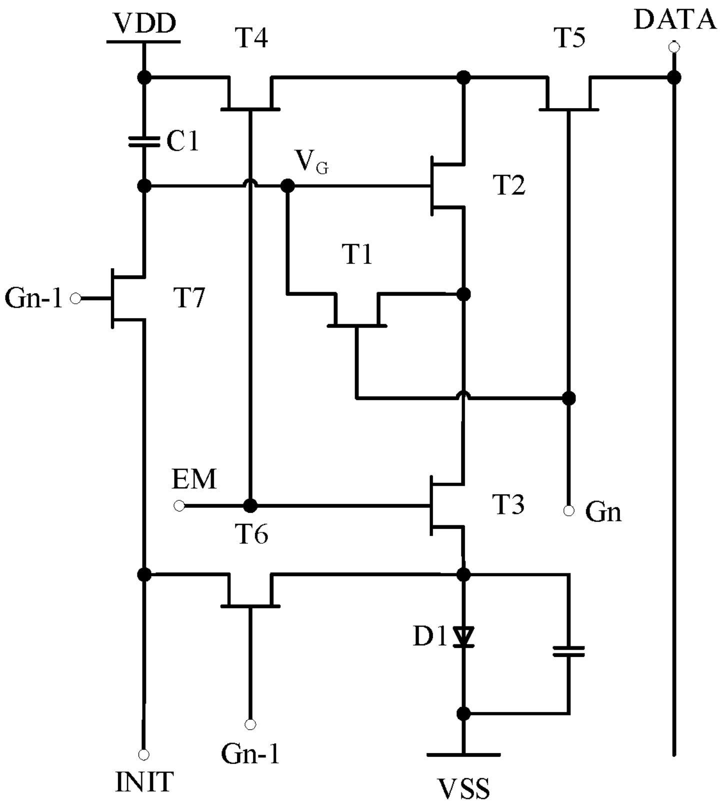
FIG. 4 is a circuit diagram of another display driver circuit according to an embodiment of this application.

FIG. 4 shows another display driver circuit according to an embodiment of this application, including a light-emitting component D1, a transistor T1 to a transistor T7, and a capacitor C1. The display driver circuit shown in FIG. 4 includes seven transistors (transistor) and one capacitor (capacitor), so that the display driver circuit is also referred to as a 7T1C display driver circuit. The light-emitting component D1 may be a light-emitting device with any color. For example, the light-emitting component D1 may be a light-emitting component with red, green, blue, white, or another color.

A power supply VDD is connected to a first electrode of the transistor T4, and the power supply VDD is further connected to a first plate of the capacitor C1. A second electrode of the transistor T4 is connected to a first electrode of the transistor T2. A second electrode of the transistor T2 is connected to a first electrode of the transistor T3. A second electrode of the transistor T3 is connected to an anode of the light-emitting component D1, and a cathode of the light-emitting component D1 is connected to a power supply VSS. A gate of the transistor T2 is connected to a second plate of the capacitor C1. Both a gate of the transistor T3 and a gate of the transistor T4 are connected to a control signal terminal (EM) for receiving a control signal. The second plate of the capacitor C1 is further connected to a first electrode of the transistor T7. A second electrode of the transistor T7 is connected to an initialization signal terminal (INIT). A gate of the transistor T7 is connected to an initialization control terminal (Gn−1). After an image frame is displayed, Gn−1 outputs a control signal to control the transistor T7 to be turned on and is connected to INIT, to complete initialization. A first electrode of the transistor T5 is connected to a second electrode of the transistor T4. A second electrode of the transistor T5 is connected to a data signal terminal (DATA). A gate of the transistor T5 is connected to a display control terminal (Gn). Gn is configured to output a control signal to control the transistor T5 to be turned on to receive data of a to-be-displayed image from DATA. A first electrode of the transistor T1 is connected to the gate of the transistor T2. A second electrode of the transistor T1 is connected to the second electrode of the transistor T2. A gate of the transistor T1 is connected to Gn. A first electrode of the transistor T6 is connected to INIT. A second electrode of the transistor T6 is connected to the second electrode of the transistor T3. A gate of the transistor T6 is connected to Gn−1. A transistor may be a metal-oxide-semiconductor field effect transistor (metal-oxide-semiconductor field effect transistor, MOSFET). The transistor is classified into two types: an N (negative)-type transistor and a P (positive)-type transistor. The transistor includes a first electrode, a second electrode, and a gate (gate). By controlling a level inputted to the gate of the transistor, the transistor may be controlled to be turned on or off. When the transistor is turned on, the first electrode is electrically connected to the second electrode to generate a turn-on current. In addition, when gate voltages of the transistor are different, amounts of the turn-on current generated between the first electrode and the second electrode are also different. When the transistor is turned off, the second electrode is not electrically connected to the second electrode, and no current is generated. In this embodiment of this application, the gate of the transistor is also referred to as a control terminal, the first electrode is referred to as a source (source), and the second electrode is referred to as a drain (drain). Alternatively, the gate is also referred to as a control terminal, the first electrode is referred to as a drain, and the second electrode is referred to as a source. It may be learned that the first electrode and the second electrode are interchangeable. Generally, an electrode from which a current flows is referred to as a source, and an electrode into which a current flows is referred to as a drain. For example, if a current flows from a first electrode to a second electrode, the first electrode is a source and the second electrode is a drain.

In addition, when a level at a control terminal of an N-type transistor is high, the N-type transistor is turned on, the first electrode is electrically connected to the second electrode, and a turn-on current between the first electrode and the second electrode is generated. When the level at the control terminal of the N-type transistor is low, the N-type transistor is turned off, the first electrode is not electrically connected to the second electrode, and no current is generated. When a level at a control terminal of a P-type transistor is low, the P-type transistor is turned on, the first electrode is electrically connected to the second electrode, and a turn-on current is generated. When the level at the control terminal of the P-type transistor is high, the P-type transistor is turned off, the first electrode is not electrically connected to the second electrode, and no current is generated.

The following is a brief description of a working principle of the display driver circuit shown in FIG. 4. First, Gn−1 outputs a control signal to control the transistor T7 and the transistor T6 to be turned on, the capacitor C1 and the light-emitting component D1 is connected to INIT for initialization, and a signal residue that may exist possibly in a previous display stage is cleared.

Then, Gn outputs a control signal to control the transistor T1 to be turned on. A data signal outputted by DATA is transmitted to the second plate of the capacitor C1 through the transistor T2 and the transistor T1 to charge the capacitor C1. This is equivalent to temporarily storing the data signal in the capacitor C1, so that the capacitor C1 is also referred to as a storage capacitor.

Next, the transistor T1 is turned off, and the light-emitting component D1 starts to emit light. Brightness is controlled by a current flowing through the first electrode and the second electrode of the transistor T2. In this embodiment of this application, the current flows from the first electrode to the second electrode of the transistor T2. Therefore, the first electrode of the transistor T2 is a source, and the second electrode of the transistor T2 is a drain. The current flowing through the first electrode and the second electrode is also referred to as a drain current ID. Because the transistor T2 works in the saturation region, a drain current when the transistor works in the saturation region is also referred to as a saturation current. In this embodiment of this application, the transistor T2 works in the saturation region and is configured to control a drive current of the light-emitting component D1. Therefore, the transistor T2 is also referred to as a driving transistor. The current ID flowing through the source and the drain of the transistor T2 is controlled by a gate voltage VG of the transistor T2, that is, a voltage of the second plate of the capacitor C1. The voltage of the second plate of the capacitor C1 is obtained by charging the second plate of the capacitor C1 by the data signal through the transistor T1 in the previous step.

In this display period, a control signal outputted by EM may control the transistor T3 and the transistor T4 to be turned on or off. A duty cycle of the control signal outputted by EM may be used for adjusting brightness or a gray scale displayed by the light-emitting component D1. The displayed brightness may be regulated by controlling the duty cycle of the control signal outputted by EM. For example, a greater duty cycle indicates higher displayed brightness, and a smaller duty cycle indicates lower displayed brightness.

In this embodiment of this application, the foregoing light-emitting component may be a current driving light-emitting component including an light emitting diode (light emitting diode, LED), a mini light emitting diode (mini light emitting diode, miniLED), a micro light emitting diode (micro light emitting diode, micro LED), an organic light emitting diode (organic light emitting diode, OLED), a micro light emitting diode (micro light emitting diode, MicroLED), a flexible organic light emitting diode (flexible organic light emitting diode, FOLED).

The following uses an example in which the light-emitting component is the OLED for description.

A voltage drop is very low after the transistor T4 and the transistor T3 are turned on. Therefore, a sum of divided voltages of the transistor T2 and the light-emitting component D1 is approximately equal to a voltage difference between the power supply VDD and the power supply VSS. The display driver circuit shown in FIG. 4 works in a fixed voltage driving mode. In other words, the voltage difference between the power supply VDD and the power supply VSS is fixed.

Because the transistor T2 works in the saturation region, and the current flowing through the first electrode and the second electrode does not decrease as voltages of the first electrode and the second electrode of the transistor T2 decrease, a stable current may be provided for the light-emitting component D1 to drive the light-emitting component D1 to emit light. When a gate voltage of the transistor T2 increases, a saturation current flowing through the first electrode and the second electrode of the transistor T2 increases, a current of the light-emitting component D1 increases, and a displayed gray scale increases. When the gate of the transistor T2 decreases, the saturation current flowing through the first electrode and the second electrode of the transistor T2 decreases, the current of the light-emitting component D1 decreases, and the displayed gray scale decreases. Therefore, different gate voltages drive the transistor T2 to output different saturation currents to enable the light-emitting component D1 to display different brightness.

When the current of the light-emitting component D1 decreases and the displayed gray scale or brightness is low, the divided voltage on the light-emitting component D1 decreases, so that a divided voltage of the transistor T2 increases. Because the transistor T2 works in the saturation region, and the current flowing through the first electrode and the second electrode does not increase as voltages of the first electrode and the second electrode of the transistor T2 increase, a stable current may be provided for the light-emitting component D1 to drive the light-emitting component D1 to emit light. Similarly, when the current of the light-emitting component D1 increases and the displayed gray scale or brightness is high, the divided voltage on the light-emitting component D1 increases, so that a divided voltage of the transistor T2 decreases.

For the power supply VDD and the power supply VSS, the voltage difference between the power supply VDD and the power supply VSS needs to ensure that the transistor T2 does not work in a linear region at any displayed brightness. Because the current flowing through the first electrode and the second electrode of the transistor T2 is not proportional to the gate voltage when the transistor T2 works in the linear region, the current flowing through the first electrode and the second electrode of the transistor T2, that is, a drive current flowing through the light-emitting component D1, cannot be regulated by regulating the gate voltage of the transistor T2. When the transistor T2 works in the saturation region, the current flowing through the first electrode and the second electrode of the transistor T2 is proportional to the gate voltage of the transistor T2. Therefore, a highest gray scale, a lowest gray scale, and all gray scales between the highest gray scale and lowest gray scale may be displayed by the light-emitting component D1 by regulating the gate voltage of the transistor T2.

However, content displayed by a display assembly dynamically changes and is not static. In other words, not all to-be-displayed images have a highest gray scale. For example, when a movie of which a main scene is a night scene is played, brightness of the night scene is low, so that gray scales of all displayed images may be low. In this way, the display driver circuit still works in a fixed voltage mode, causing a large waste of power consumption.

In view of this, this embodiment of this application provides a voltage regulation method for regulating a working voltage of the display driver circuit based on a gray scale of a to-be-displayed image, thereby achieving a purpose of reducing power consumption.

Figure 5:
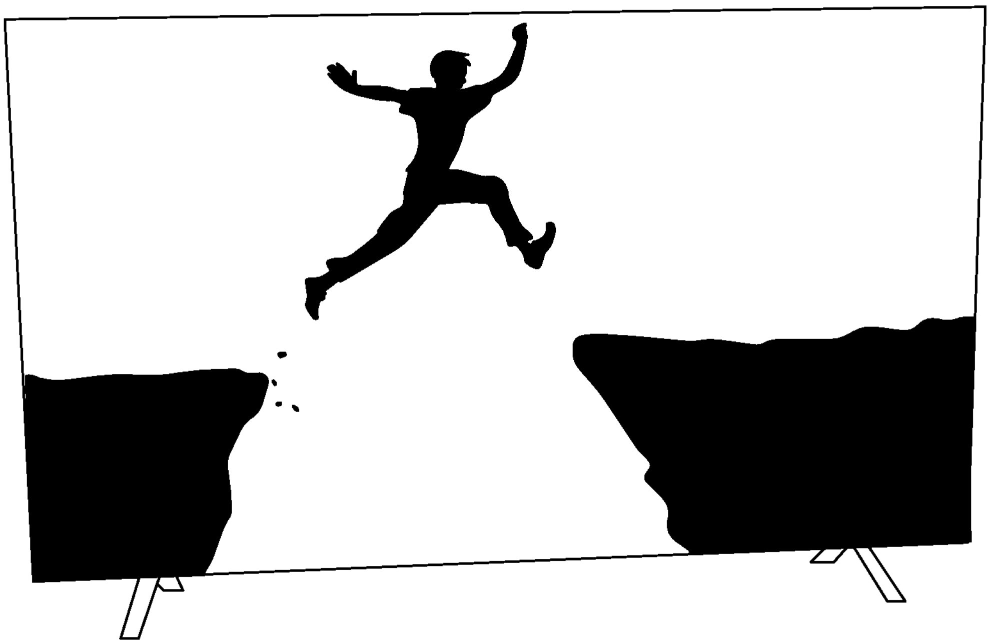
FIG. 5 is a schematic diagram of a terminal device according to an embodiment of this application.

In a possible implementation, refer to FIG. 5. A voltage regulation method provided in an embodiment of this application may be applied to a television, for example, a smart screen. According to the method provided in this embodiment of this application, lowest working voltages corresponding to highest gray scales of color channels may be determined based on the highest gray scales of the color channels of an image displayed on the smart screen. A maximum value of the lowest working voltages corresponding to the highest gray scales of the color channels is used as a target working voltage. This can reduce power consumption of the television when it is ensured that all gray scales of the color channels can be displayed.

Figure 6:
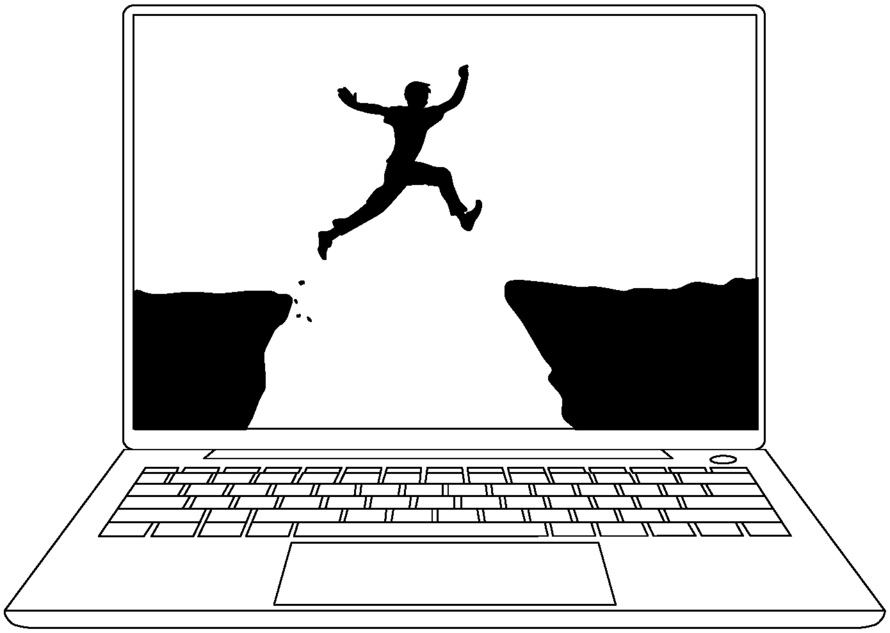
FIG. 6 is a schematic diagram of another terminal device according to an embodiment of this application.

In a possible implementation, refer to FIG. 6. A voltage regulation method provided in an embodiment of this application may be applied to a computer monitor. As shown in FIG. 6, according to the method provided in this embodiment of this application, lowest working voltages corresponding to highest gray scales of color channels may be determined based on the highest gray scales of the color channel of an image displayed on the monitor. A maximum value of the lowest working voltages corresponding to the highest gray scales of all color channels is determined as a target voltage. This can reduce power consumption of the monitor when it is ensured that all gray scales of the color channels can be displayed.

Figure 7:
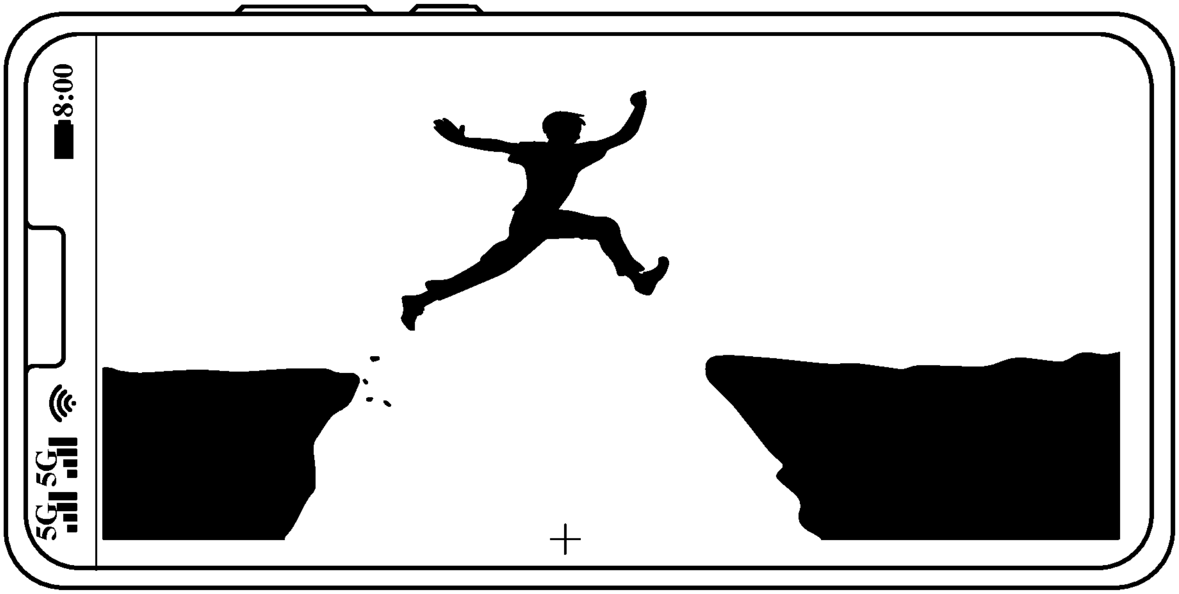
FIG. 7 is a schematic diagram of another terminal device according to an embodiment of this application.

In a possible implementation, a voltage regulation method provided in an embodiment of this application may be applied to a mobile phone. As shown in FIG. 7, according to the method provided in this embodiment of this application, lowest working voltages corresponding to highest gray scales of color channels may be determined based on the highest gray scales of the color channels of an image displayed on the mobile phone. A maximum value of the lowest working voltages corresponding to the highest gray scales of the color channels is determined as a target voltage. This can reduce power consumption of a display screen of the mobile phone when it is ensured that all gray scales of the color channels can be displayed.

The foregoing describes examples of application scenarios in this embodiment of this application and does not constitute any limitation to the application scenarios in embodiments of this application. The method provided in embodiments of this application may be applied to any terminal device that performs display by using a display driver circuit.

Figure 8:
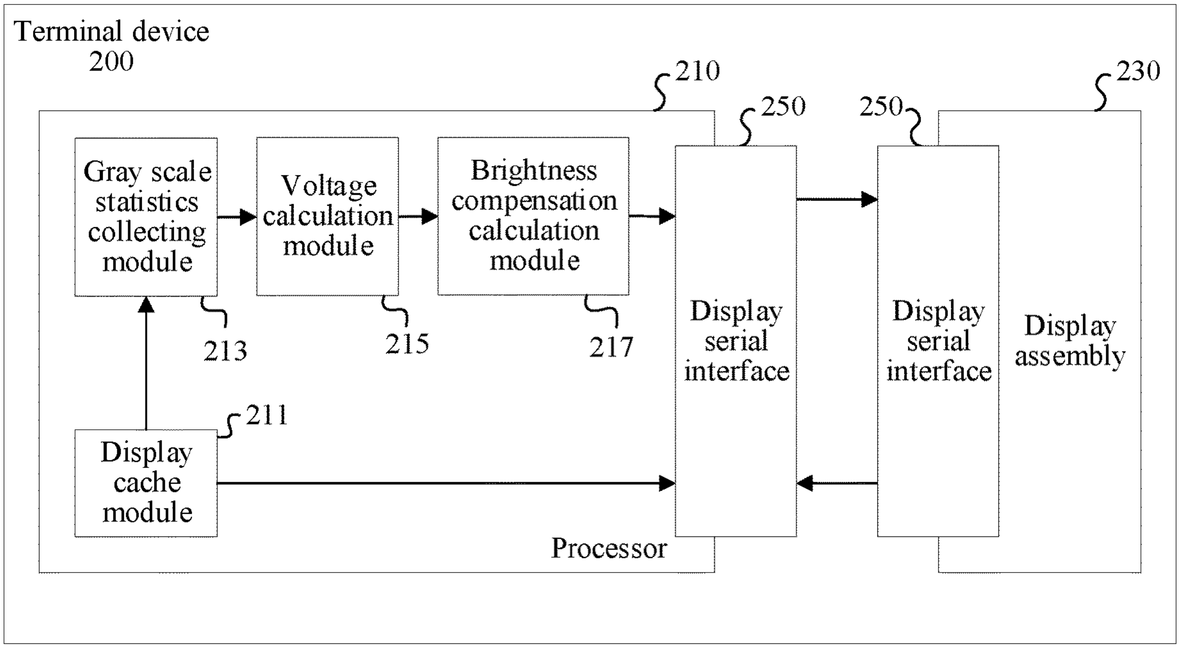
FIG. 8 is a schematic diagram of a system architecture of a terminal device according to an embodiment of this application.

For example, FIG. 8 is a schematic diagram of a system architecture of a terminal device according to an embodiment of this application. The terminal device may be the terminal device 100 shown in FIG. 1, or any one of the terminal devices shown in FIG. 5 to FIG. 7. Referring to FIG. 8, the terminal device 200 may include a processor 210, a display assembly 230, and a display serial interface 250.

The processor 210 includes a display cache module 211, a gray scale statistics collecting module 213, a voltage calculation module 215, and a brightness compensation calculation module 217. For example, the display assembly 230 may include a display panel and a print circuit board (print circuit board, PCB). A display driver circuit is provided on the PCB. For example, the display driver circuit may be the display driver circuit shown in FIG. 4 or another display driver circuit. The display assembly drives image data to be displayed on the display panel by the display driver circuit.

For example, the processor 210 provided in this embodiment of this application may be a central processing unit (central processing unit, CPU), a graphics processing unit (GPU), or another processor configured to display a video or an image that are in the terminal device 200.

For example, the display panel may use a light-emitting component, such as an LED, a miniLED, a micro LED, an OLED, a MicroLED, or an FOLED.

For example, the gray scale statistics collecting module 213, the voltage calculation module 215, and the brightness compensation calculation module 217 may be integrated on a system on chip (system on chip, SOC) of the terminal device 200.

For example, the display cache module 211 is configured to store image or video data. The display cache module 211 may send a to-be-displayed image or data to the display assembly for display through the display serial interface 250. The display assembly 230 displays the to-be-displayed image frame by frame. After a display period ends, the display assembly 230 may send a synchronization signal through the display serial interface 250 to notify the processor 210 to send a next to-be-displayed image frame for display.

The gray scale statistics collecting module 213 is configured to determine highest gray scales of color channels of the to-be-displayed image. The highest gray scale refers to a maximum value of gray scales corresponding to all pixels of a specific color channel of the to-be-displayed image. Generally, a range of gray scales is 0 to 255. A greater gray scale indicates higher brightness. Each pixel includes a plurality of color channels. Therefore, the gray scale statistics collecting module 213 may determine the highest gray scales corresponding to the color channels. The voltage calculation module 215 is configured to determine lowest working voltages corresponding to the highest gray scales of the color channels based on the highest gray scales corresponding to the color channels, determine a maximum value of the lowest working voltages corresponding to the color channels as a target working voltage, and then determine a voltage adjustment value based on the target working voltage and an input voltage of the display driver circuit. The processor 210 sends a control instruction to the display assembly 230 through the display serial interface 250, to enable the display assembly 230 to adjust a working voltage of the display driver circuit to the target working voltage when the to-be-displayed image is displayed.

For example, the foregoing control instruction may include the target working voltage or may include the voltage adjustment value determined based on a difference between the target working voltage and the input voltage of the display driver circuit. The display assembly 230 adjusts a power supply voltage of the display driver circuit based on the voltage adjustment value, so that a voltage difference between a power supply VDD and a power supply VSS reaches the foregoing target working voltage, to reduce power consumption of the display driver circuit.

In addition, the processor 210 further includes the brightness compensation calculation module 217. The brightness compensation calculation module 217 is configured to calculate a brightness compensation value. In an ideal state, when a driving transistor of the display driver circuit works in a saturation region, and voltages of a first electrode and a second electrode of the driving transistor change, a current flowing through the first electrode and the second electrode remains constant, but the driving transistor cannot reach the ideal state, and a slope of an output characteristic curve is not 0. Therefore, when the voltage decreases, a saturation current of the driving transistor decreases slightly. This causes a gray scale displayed by a light-emitting component to decrease. Therefore, brightness needs to be compensated to compensate a gray scale loss caused by the slope of the output characteristic curve of the driving transistor not being 0.

For example, the brightness compensation calculation module 217 may determine a current variation based on the output characteristic curve of the driving transistor, that is, a correspondence between an output current and a voltage of the driving transistor. For example, when a voltage between the first electrode and the second electrode of the driving transistor returns from V1 to V2, a current decreases from I1 to I2. A difference between the current I1 and the current I2 is a current variation, and the current variation causes brightness of the light-emitting component to decrease, so that brightness compensation of the light-emitting component is needed.

For example, the current variation here may be determined as brightness compensation amount. The brightness compensation amount is sent to the display assembly 230 through 250. The display assembly automatically compensates the brightness of the light-emitting component based on the brightness compensation amount, that is, the current variation of the light-emitting component. For example, a duty cycle of a control signal outputted by an EM terminal in the display driver circuit may increase.

Certainly, if the driving transistor can reach the ideal state and the slope of the output characteristic curve of the driving transistor is 0, there is no need for brightness compensation, and there is no need to dispose the brightness compensation calculation module 217.

Figure 9:
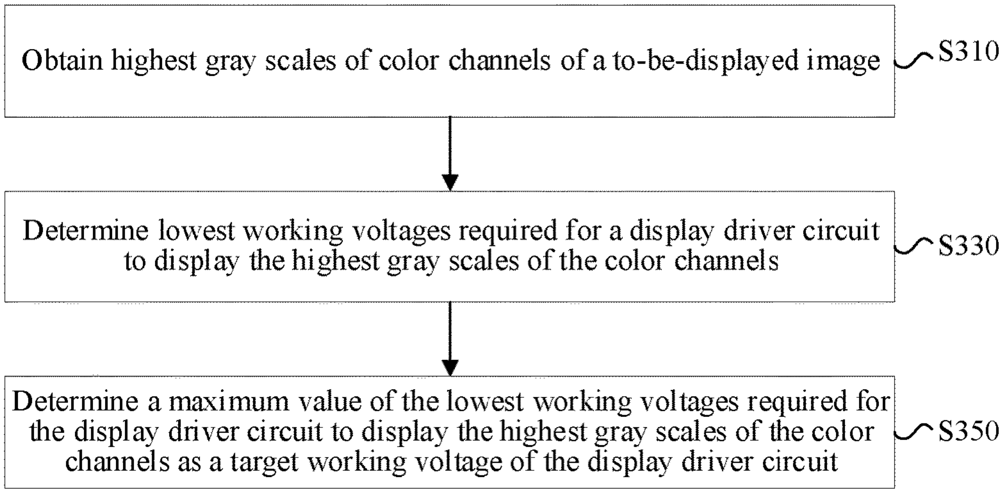
FIG. 9 is a schematic flowchart of a voltage regulation method according to an embodiment of this application.

FIG. 9 is a schematic flowchart of a voltage regulation method according to an embodiment of this application. The voltage regulation method provided in this embodiment of this application is applied to a processor of a terminal device. The terminal device further includes a display assembly, and the display assembly includes a display driver circuit. The voltage regulation method provided in this embodiment of this application is described in details with reference to the accompanying drawings. Refer to FIG. 9. The voltage regulation method provided in this embodiment of this application includes:

S310: Obtain highest gray scales of color channels of a to-be-displayed image.

S330: Determine lowest working voltages required for the display driver circuit to display the highest gray scales of the color channels.

S350: Determine a maximum value of the lowest working voltages required for the display driver circuit to display the highest gray scales of the color channels as a target working voltage of the display driver circuit.

A conventional display driver circuit works in a fixed voltage mode. A working voltage of the display driver circuit can ensure that a lowest gray scale to a highest gray scale can be displayed on each pixel. For example, if the lowest gray scale is 0, and the highest gray scale is 255, the working voltage of the display driver circuit may enable a display driver circuit corresponding to a light-emitting component with any color to drive the light-emitting component to display a gray scale range of 0 to 255.

Generally, the working voltage of the display driver circuit is maintained at a high voltage level to ensure that all gray scales can be displayed, but display content changes dynamically. For example, a gray scale of a previous image frame is high and a gray scale of a next image frame is low. It is possible that the highest gray scale of each pixel on the image is lower than a highest gray scale that the light-emitting component can display. For example, if the highest gray scale that the light-emitting component can display is 255, but the highest gray scale of all pixels on the image is 200, the working voltage of the driver display circuit still uses the highest gray scale of 255, and a waste of power consumption can be caused. Therefore, according to the solution provided in this embodiment of this application, the highest gray scales of the color channels of the to-be-displayed image is first obtained, and the working voltage of the display driver circuit is determined based on the highest gray scales of the color channels of the to-be-displayed image.

In addition, because relationship curves of currents and voltages of light-emitting components with different colors are different, correspondences between gray scales and drive voltages of the light-emitting components with different colors are also different. For example, a drive voltage required when a red light-emitting component displays a highest gray scale is lower than a drive voltage required when a blue light-emitting component displays a highest gray scale. Therefore, according to the solution in this embodiment of this application, lowest working voltages required for the display driver circuit to display the highest gray scales of the color channels is first determined based on the highest gray scales of the color channels of the to-be-displayed image. The color channels here refer to color channels of the light-emitting component. For example, if the image is displayed by a display in an RGB mode, the color channels here refer to three channels of red, green, and blue. If the image is displayed by the display in an RGBW mode, the color channels here refer to channels of red, green, blue, and white.

A maximum value of the lowest working voltages required for the highest gray scales of the color channels is determined as the target working voltage of the display driver circuit after the lowest working voltages required for the display driver circuit to display the highest gray scales of the color channels is determined. Because a display driver circuit of each pixel of a display panel uses a same input voltage as a working voltage, for example, in the display driver circuit shown in FIG. 4, the input voltage of the power supply VDD and the power supply VSS is used as a working voltage, to avoid that a part of the display driver circuit cannot display normally due to a low working voltage, the maximum value of the lowest working voltages required for the highest gray scales of the color channels is needed to be determined as the target working voltage of the display driver circuit.

For example, using the RGB mode as an example, a highest gray scale of a red channel of a to-be-displayed image is R1, a highest gray scale of a green channel is G1, and a highest gray scale of a blue channel is B1. A lowest working voltage of a display driver circuit of a red light-emitting component is $V_{R1}$ when R1 is displayed. A lowest working voltage of a display driver circuit of a green light-emitting component is $V_{G1}$ when G1 is displayed. A lowest working voltage of a display driver circuit of a blue light-emitting component is $V_{B1}$ when B1 is displayed. A maximum value among $V_{R1}$, $V_{G1}$, and $V_{B1}$ needed to be determined as a target working voltage of the display driver circuit. In this way, it may be ensured that all gray scales of color channels of the to-be-displayed image may be displayed.

According to the voltage regulation method provided in this embodiment of this application, the working voltage of the display driver circuit may be adjusted based on the gray scales of the to-be-displayed image. First, the highest gray scales of the color channels of the to-be-displayed image are determined, and the lowest working voltages required for the display driver circuit to display the highest gray scales of the color channels are determined. Then, the maximum value of the lowest working voltages required for the highest gray scales of the color channels is used as the target working voltage of the display driver circuit. In this way, a maximum value of lowest working voltages required for displaying highest gray scales of different color channels is used as a target working voltage of a display driver circuit. This can ensure that all gray scales of the to-be-displayed image can be displayed normally. In addition, the working voltage of the display driver circuit is adjusted based on the gray scales of the to-be-displayed image, so that power consumption of the display driver circuit can be reduced when an image with a low gray scale is displayed.

Figure 10:
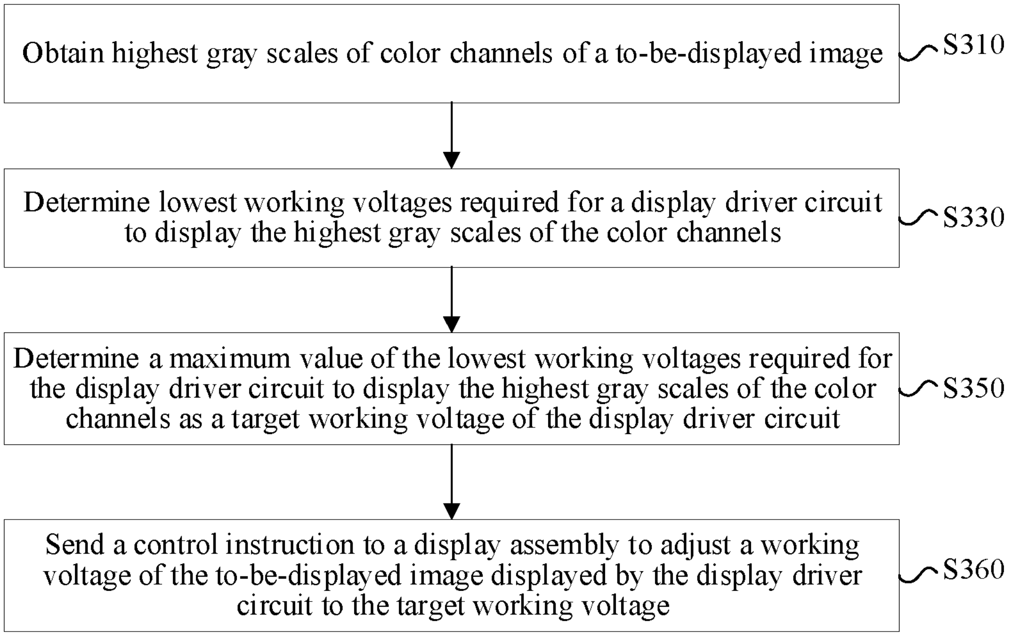
FIG. 10 is a schematic flowchart of another voltage regulation method according to an embodiment of this application.

In a possible implementation, the processor is connected to a display assembly via a display serial interface. After the target working voltage of the display driver circuit corresponding to the to-be-displayed image is determined, referring to FIG. 10, the method further includes:

S360: Send a control instruction to the display assembly to adjust a working voltage of the to-be-displayed image displayed by the display driver circuit to the target working voltage.

In a possible implementation, the display driver circuit is powered by a power supply VDD and a power supply VSS. A voltage difference between the power supply VDD and the power supply VSS is the working voltage of the display driver circuit.

According to the voltage regulation method provided in this embodiment of this application, the working voltage of the display driver circuit may be adjusted based on the gray scales of the to-be-displayed image. Therefore, the processor sends the control instruction to the display assembly. When a corresponding image is displayed, the display assembly adjusts the working voltage of the display driver circuit to the target working voltage based on the control instruction sent by the processor, to reduce power consumption.

In a possible implementation, the control instruction sent by the processor may include a voltage adjustment value. The voltage adjustment value is a difference between an input voltage and the target working voltage that are of the display driver circuit.

In some implementations, the input voltage of the display driver circuit includes the power supply VDD and the power supply VSS. Because the power supply VDD is a common reference voltage for a plurality of sub-circuits (including the display driver circuit) in the display assembly, the power supply VDD is generally not adjusted. When the working voltage of the display driver circuit is adjusted, a voltage of the power supply VSS may be adjusted.

For example, the power supply VDD is +9 V and the power supply VSS is −3 V, so that the working voltage of the display driver circuit is 12 V. If the target working voltage of the display driver circuit is determined as 9 V based on the gray scales of the to-be-displayed image, the voltage adjustment value is 3 V. When the power supply VSS is adjusted, because the voltage of the power supply VSS is −3 V, the voltage of the power supply VSS after adjusting 3 V is 0 V. In a case that the voltage of the power supply VDD is +9 V and the voltage of the power supply VSS is 0 V, the voltage of the display driver circuit is adjusted to 9 V. Therefore, the working voltage is reduced, and power consumption of the display driver circuit can also be reduced.

Certainly, in some other possible implementations, the control instruction sent by the processor to the display assembly may include the target working voltage. The display assembly adjusts the working voltage of the display driver circuit to the target working voltage based on the control instruction sent by the processor.

Figure 11:
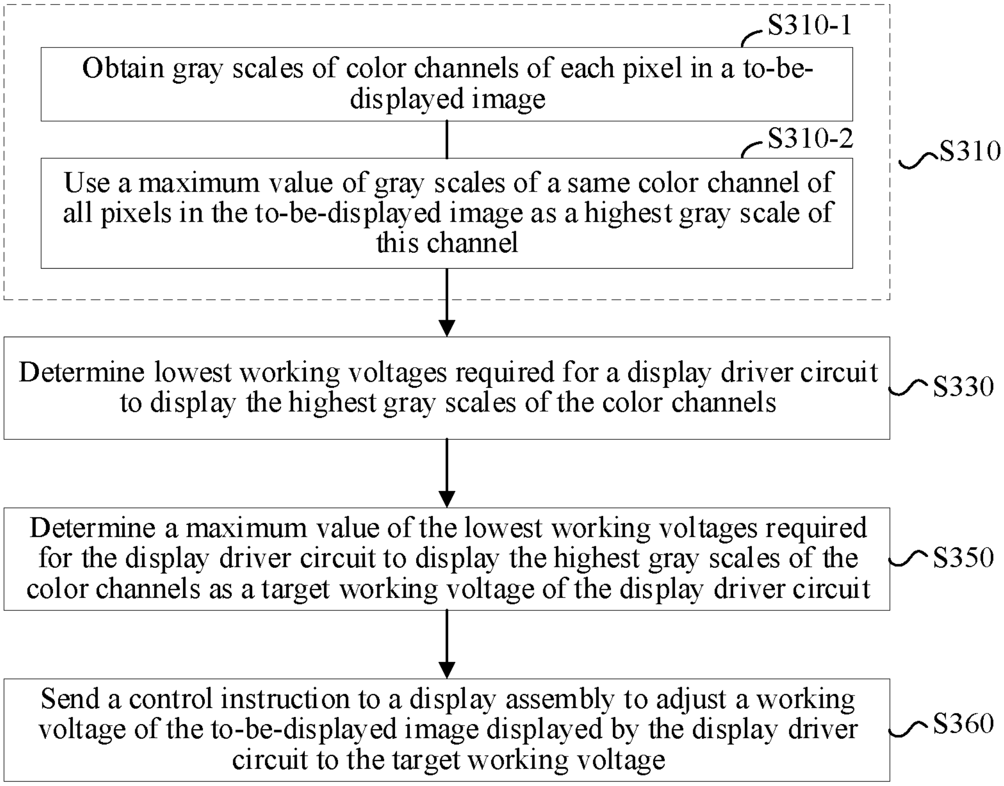
FIG. 11 is a schematic flowchart of another voltage regulation method according to an embodiment of this application.

For example, refer to FIG. 11. There are many manners to obtain highest gray scales of color channels of a to-be-displayed image. For example, S310 may include the following steps.

S310-1: Obtain gray scales of color channels of each pixel in the to-be-displayed image.

S310-2: Use a maximum value of gray scales of a same color channel of all pixels in the to-be-displayed image as a highest gray scale of this channel.

The to-be-displayed image includes a plurality of pixels. Gray scales of color sub-pixels of each pixel in the to-be-displayed image may be traversed, and then a maximum value of the gray scales of all color sub-pixels is used as a highest gray scale of the color channel. For example, using RGB as an example, a maximum value of gray scales of red sub-pixels of all pixels is used as a highest gray scale of a red channel, a maximum value of gray scales of green sub-pixels of all pixels is used as a highest gray scale of a green channel, and a maximum value of gray scales of blue sub-pixels of all pixels is used as a highest gray scale of a blue channel, so that highest gray scales of the red channel, the green channel, and the blue channel are determined.

Figure 12:
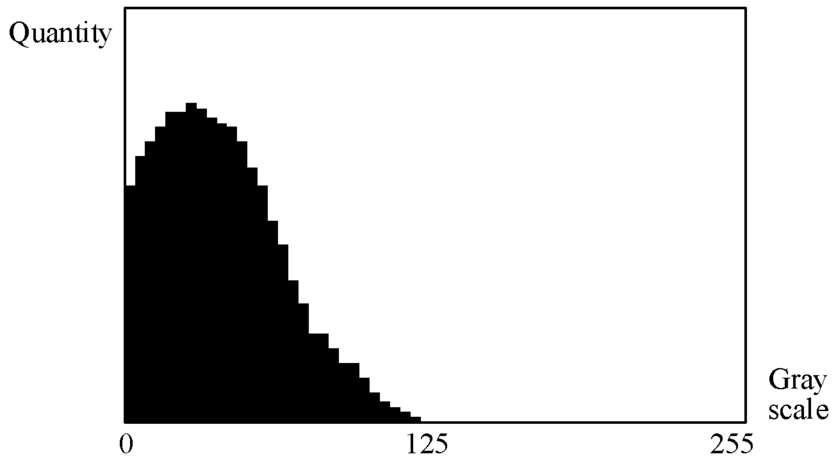
FIG. 12 is a histogram of gray scales according to an embodiment of this application.

In some other possible implementations, the highest gray scales of the color channels may alternatively be determined based on histograms of gray scales of colors of the to-be-displayed image. FIG. 12 is a histogram of gray scales of a color channel. A horizontal axis represents gray scales. A vertical axis represents a quantity of pixels. As shown in FIG. 12, it may be learned that a highest gray scale of this color channel of the image is 125.

Alternatively, the to-be-displayed image may be preprocessed by a graphics processing unit (graphics processing unit, GPU), a video decoder, a video processing unit (video processing unit, VPU), or the like, to determine highest gray scales of color channels of the to-be-displayed image.

Figure 13:
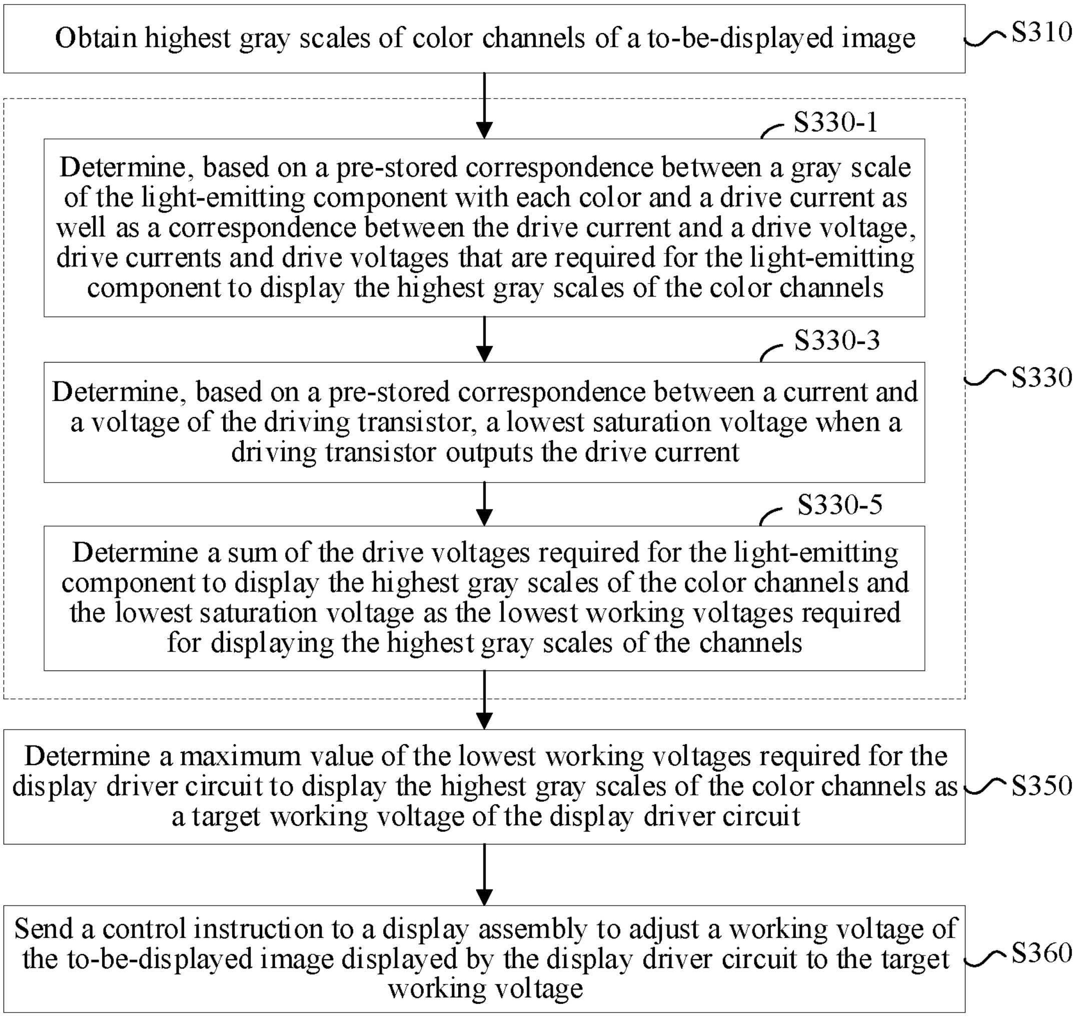
FIG. 13 is a schematic flowchart of another voltage regulation method according to an embodiment of this application.

After the highest gray scales of the color channels of the to-be-displayed image are obtained, a lowest working voltage required for a display driver circuit to display the highest gray scales of the color channels. For example, refer to FIG. 13. Step S330 includes the following steps.

S330-1: Determine, based on a pre-stored correspondence between a gray scale of the light-emitting component with each color and the drive current as well as a correspondence between the drive current and a drive voltage, drive currents and drive voltages that are required for the light-emitting component to display the highest gray scales of the color channels.

Figure 14:
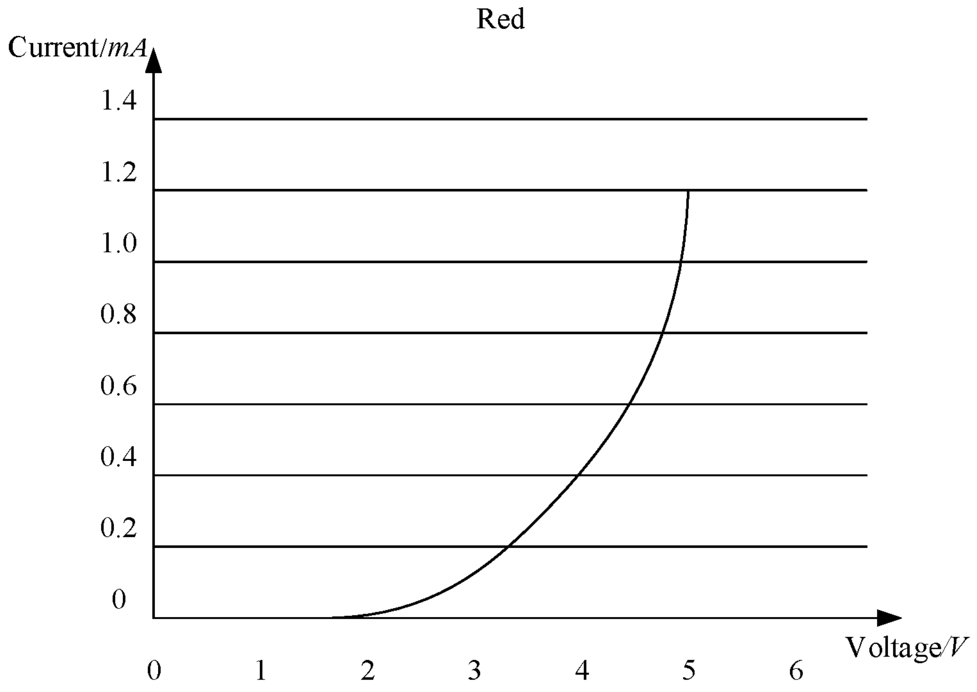
FIG. 14 is a schematic diagram of a relationship between a current and a voltage of a red light-emitting component according to an embodiment of this application.
Figure 15:
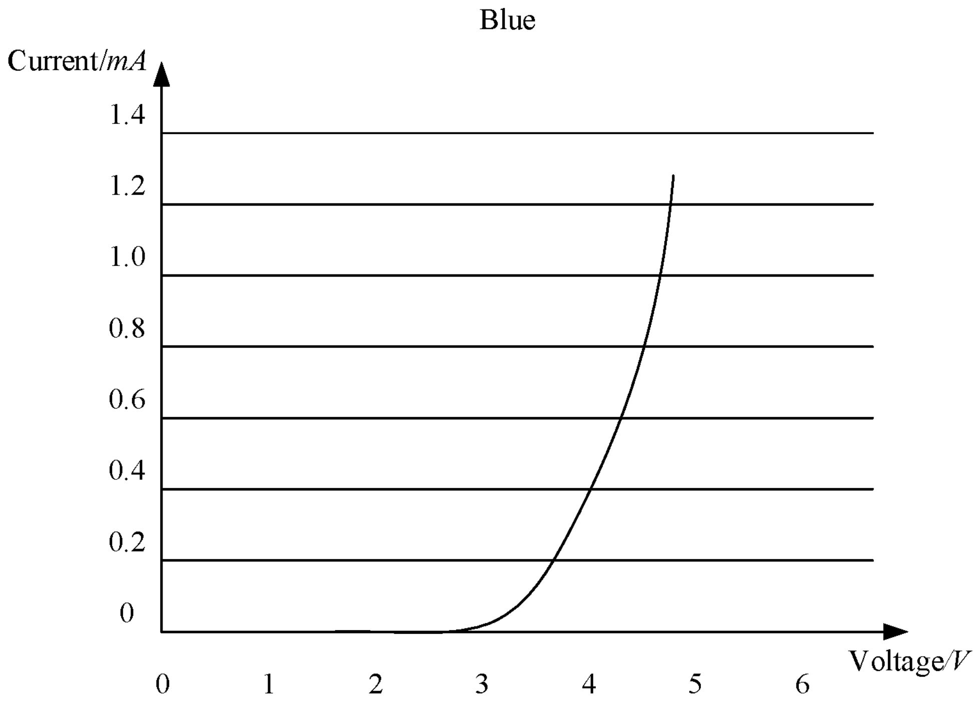
FIG. 15 is a schematic diagram of a relationship between a current and a voltage of a blue light-emitting component according to an embodiment of this application.
Figure 16:
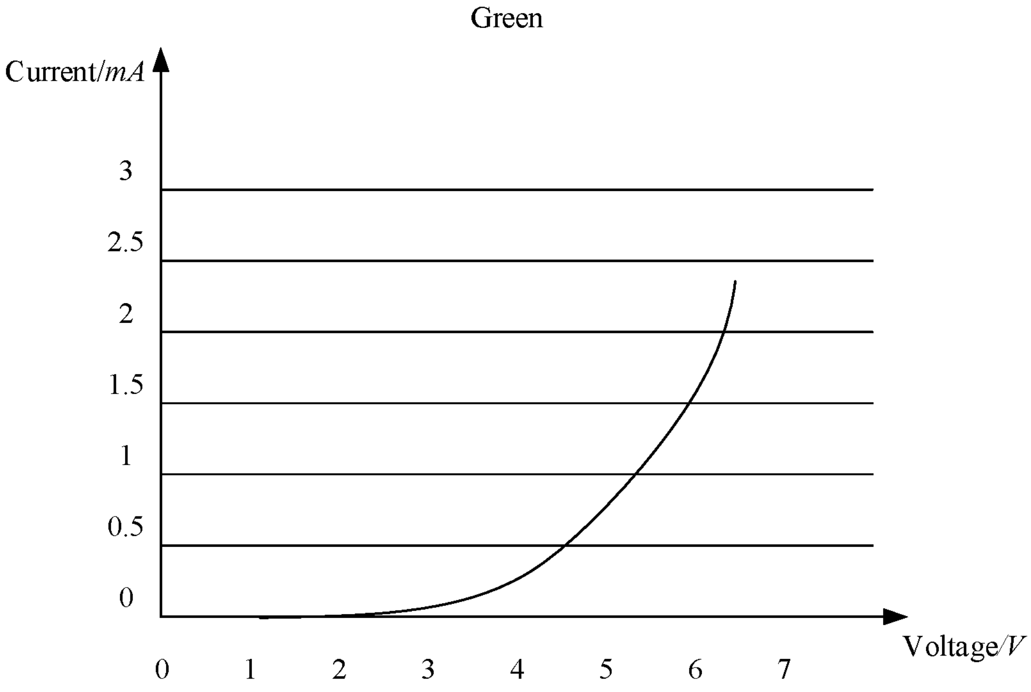
FIG. 16 is a schematic diagram of a relationship between a current and a voltage of a green light-emitting component according to an embodiment of this application.

The foregoing examples have described that light-emitting components with different colors have different relationship curves between currents and voltages. Therefore, in this embodiment of this application, an OLED display in the RGB mode is used as an example for description. FIG. 14 shows a V-I characteristic curve of a red OLED. FIG. 15 shows a V-I characteristic curve of a blue OLED. FIG. 16 shows a V-I characteristic curve of a green OLED.

The light-emitting component provided in this embodiment of this application is a current driving light-emitting component. To be specific, a gray scale displayed by the light-emitting component is positively correlated with a drive current. When the drive current is maximum, a highest gray scale is displayed, and when the drive current is minimum, a lowest gray scale is displayed. Refer to FIG. 14. A drive current of the red OLED reaches the maximum when a drive voltage is about 5 V, and a highest gray scale is displayed. It should be noted that the highest gray scale here refers to a highest gray scale that can be displayed by the light-emitting component, not a highest gray scale of the to-be-displayed image. For example, the highest gray scale that can be displayed by the red OLED is 255. With reference to FIG. 14, the red OLED displays the highest gray scale of 255 when the drive voltage is about 5 V. Similarly, with reference to FIG. 15, the blue OLED displays a highest gray scale of 255 when a drive voltage is close to 5 V. With reference to FIG. 16, the green OLED displays a highest gray scale of 255 when a drive voltage exceeds 6 V. It may be learned that when a same gray scale (for example, 255) is displayed, different light-emitting components need different drive currents or drive voltages. If the drive voltage is about 5 V, the highest gray scale can be displayed by the red OLED and the blue OLED, but the highest gray scale cannot be displayed by the green OLED because of the low drive voltage. It may be learned that it is necessary to determine lowest working voltages of light-emitting components with different channels respectively corresponding to highest gray scales of color channels, and take a maximum value as a target working voltage of an entire display driver circuit.

The foregoing examples have described that the working voltage of the display driver circuit is a sum of voltages of the light-emitting component and the driving transistor. Therefore, first, after the highest gray scales of the color channels of the to-be-displayed image are obtained, drive currents and drive voltages that are required for the highest gray scales of the color channels of the light-emitting component are determined.

For example, the drive currents and the drive voltages that are required for the light-emitting component to display the highest gray scales of the color channels are determined based on a pre-stored correspondence between a gray scale and the drive current as well as a correspondence between the drive current and a drive voltage.

For example, in a possible implementation, a correspondence between a gray scale displayed by a light-emitting component and a drive current as well as a correspondence between a drive current and a drive voltage may be stored in a form of a table. In this way, after the highest gray scales of the color channels of the to-be-displayed image are obtained, the drive currents and the drive voltages that are required for the light-emitting component to display the highest gray scales of the color channels may be obtained by looking up the table.

An example in which the light-emitting component is an OLED is used. After an OLED production is completed, a correspondence between each gray scale and each drive current that are of OLEDs with different colors is known. A relationship between each drive current and each voltage that are of the OLEDs with different colors, or referred to as a V-I characteristics, is also known. For example, in a possible implementation, correspondences between a gray scale displayed by a red OLED, a drive current, and a drive voltage may be stored in a form of Table 1. If a highest gray scale of a red channel of the to-be-displayed image is 200, a drive current and a drive voltage of a red light-emitting component when the gray scale is 200 may be determined based on the correspondence between the gray scale and the drive current as well as the correspondence between the drive current and the drive voltage shown in Table 1.

TABLE 1

| Red OLED | | |
|---|---|---|
| Gray scale | Drive current/mA | Drive voltage/V |
| 0 | 0 | 0 |
| 1 | 0.1 | 2.1 |
| 2 | 0.1 | 2.3 |
| | . . . | |
| 255 | 2.4 | 5 |

The correspondence between working parameters such as the gray scale of the OLED, the drive current, and the drive voltage may alternatively be stored in another form. This is not limited in embodiments of this application. After the highest gray scales of the color channels of the to-be-displayed image are obtained, drive currents and drive voltages that are required for the light-emitting component to display the highest gray scales of the color channels are separately determined.

S330-3: Determine, based on a pre-stored correspondence between a current and a voltage of the driving transistor, the lowest saturation voltage when the driving transistor outputs the drive current.

S330-5: Determine a sum of the drive voltage required for the highest gray scales of the color channels displayed by the light-emitting component and the lowest saturation voltage as the lowest working voltage required for displaying the highest gray scales of the channels.

The previous examples have described that the driving transistor works in the saturation region, so that a stable saturation current can be outputted to be used as the drive current of the light-emitting component.

With reference to the relationship curve of the current and the voltage of the driving transistor working in the saturation region shown in FIG. 3 in the previous example, when the driving transistor works in the saturation region, a drain current ID does not change with a change of a drain source voltage $V_{DS}$, that is, does not change, and the drain current ID only changes with a change of a gate source voltage $V_{GS}$ of the driving transistor. In other words, when the drive current of the light-emitting component remains stable, a divided voltage on the driving transistor may increase or decrease. Provided that the driving transistor still works in the saturation region, a change of the divided voltage on the driving transistor does not affect work of the light-emitting component.

Because the driving transistor and the light-emitting component are connected in series between the power supply VDD and the power supply VSS, when the divided voltage of the light-emitting component increases, the divided voltage on the driving transistor decreases. Using the red OLED as an example, when the highest gray scale of the red channel of the to-be-displayed image is displayed by the light-emitting component, the drive voltage of the light-emitting component reaches the maximum, and the divided voltage of the driving transistor is the minimum. When the gray scale displayed by the light-emitting component decreases, the drive voltage of the light-emitting component decreases, and the divided voltage of the driving transistor increases. In this way, provided that it is ensured that the highest gray scale of the red channel of the to-be-displayed image is displayed by the light-emitting component, to be specific, the driving transistor still works in the saturation region when the divided voltage of the driving transistor is minimum, the driving transistor can work in the saturation region when any gray scale of the red channel of any to-be-displayed image is displayed by the light-emitting component.

In other words, provided that the driving transistor can work in the saturation region when the highest gray scale is displayed by the light-emitting component, the driving transistor remains working in the saturation region when any gray scale is displayed by the light-emitting component. To reduce power consumption of the display driver circuit, a lowest saturation voltage is determined when the driving transistor outputs the drive currents required for displaying the highest gray scales of the color channels.

For example, in this embodiment of this application, the lowest saturation voltage refers to a lowest voltage when the driving transistor outputs a current required for the light-emitting component to display the highest gray scale and works in the saturation region. For example, with reference to FIG. 17, if a current required for the light-emitting component to display the highest gray scale is 100 mA, when a drain source voltage of the driving transistor is V4, the drain current outputted by the driving transistor is 100 mA, so that the highest gray scale may be displayed by the light-emitting component. When the drain source voltage of the driving transistor is V3, because the driving transistor works in the saturation region, the drain current does not change or changes a little when the drain source voltage decreases, and the drain current outputted by the driving transistor is still 100 mA, so that the highest gray scale may be still displayed by the light-emitting component. When the highest gray scale is displayed by the light-emitting component, the drive current and the drive voltage of the light-emitting component remain unchanged, and power consumption is unchanged. However, a source drain voltage of the driving transistor may be V3 or V4, and V4>V3. It may be learned that when the output current is unchanged, a greater voltage indicates greater power consumption of the driving transistor. Therefore, to reduce the power consumption, when the highest gray scale is displayed by the light-emitting component, the divided voltage of the driving transistor is enabled to reduce to the lowest voltage in the saturation region, that is, a lowest saturation voltage proposed by this embodiment of this application. In this way, the drive current and the drive voltage of the light-emitting component are unchanged, and the divided voltage of the driving transistor is reduced to the lowest saturation voltage. A sum of the drive voltage of the light-emitting component and the lowest saturation voltage of the driving transistor, that is, the working voltage of the display driver circuit, reaches a lowest state. A sum of drive voltages corresponding to the drive currents required for the light-emitting component to display the highest gray scales of three channels of red, green, and blue and the lowest saturation voltage of the driving transistor is determined as the target working voltage of the display driver circuit. In this way, in a case that the gray scale of the to-be-displayed image is low, the target working voltage of the display driver circuit is also reduced, and power consumption of the display driver circuit is reduced.

In addition, because the current of the light-emitting component is less affected when the working voltage of the driver display circuit is adjusted, and generally, regulation speed may reach more than 60 frames per second, a problem of display flicker does not occur.

Using the OLED display in the RGB mode is as an example, after the lowest saturation voltage when the driving transistor outputs the drive currents required for displaying the highest gray scales of the color channels is determined, a sum of a drive voltage when a highest gray scale of a red channel is displayed by the light-emitting component and the lowest saturation voltage of the driving transistor is determined as a lowest working voltage required for the display driver circuit to display the highest gray scale of the red channel. A sum of a drive voltage when a highest gray scale of a green channel is displayed by the light-emitting component and the lowest saturation voltage of the driving transistor is determined as a lowest working voltage required for the display driver circuit to display the highest gray scale of the green channel. A sum of a drive voltage when a highest gray scale of a blue channel is displayed by the light-emitting component and the lowest saturation voltage of the driving transistor is determined as a lowest working voltage required for the display driver circuit to display the highest gray scale of the blue channel.

In addition, because the highest gray scales of the color channels of the to-be-displayed image may be different, for example, if the to-be-displayed image is overall yellowish, the highest gray scales of the red and green channels may be high, and the highest gray scale of the blue channel may be low. For example, the highest gray scale of the red channel is 255, the highest gray scale of the green channel is 255, and the highest gray scale of the blue channel is 10. If the to-be-displayed image is overall gray, the highest gray scales of the three channels of red, green, and blue may be close, for example, are all 123. The foregoing examples have described that correspondences among gray scales, currents, and the voltages of light-emitting components with different colors are different. All light-emitting components share a same working voltage, so that when a target working voltage is selected, a maximum value of the lowest working voltages required for the highest gray scales of the color channels needs to be determined as a target working voltage of the display driver circuit, and a working voltage required for a highest gray scale in different color channels cannot be used as a target working voltage.

For example, with reference to FIG. 14 to FIG. 16, if the highest gray scale of the red channel of the to-be-displayed image is 255, the highest gray scale of the blue channel is 230, and the highest gray scale of the green channel is 240, a lowest working voltage required for the red light-emitting component to display the gray scale of 255, a lowest working voltage required for the blue light-emitting component to display the gray scale of 230, and a lowest working voltage required for the green light-emitting component to display the gray scale of 240 need to be respectively determined when the target working voltage is determined. Then, a maximum value of the lowest working voltages required for the color channels is used as the target working voltage of the display driver circuit. In this way, it can be ensured that the highest gray scales of the channels can be displayed normally.

Because a lowest working voltage required for the green light-emitting component to display the blue gray scale of 240 is greater than a lowest working voltage required for the red light-emitting component to display the gray scale of 255, if the lowest working voltage required for the red light-emitting component to display the gray scale of 255 is used as the target working voltage, the green gray scale of 240 cannot be displayed by the green light-emitting component. Therefore, in this embodiment of this application, the maximum value of the lowest working voltages required for the highest gray scales of the color channels is determined as the target working voltage of the display driver circuit after the lowest working voltages required for the display driver circuit to display the highest gray scales of the color channels are determined. In this way, it can be ensured that the gray scales of the color channels of the to-be-displayed image can be displayed normally.

In an ideal state, the driving transistor works in the saturation region, and the drain current does not change when the drain source voltage changes. If a horizontal axis represents the drain source voltage and a vertical axis represents the drain current in the schematic diagram of the relationship curve between the current and the voltage, a curve of the drain current of the transistor in the saturation region is parallel to the horizontal axis in an ideal case.

However, in some cases, the driving transistor cannot reach the ideal state, and the curve of the drain current has a specific slope, so that the drain current may change when the drain source voltage of the driving transistor is adjusted to the lowest saturation voltage. The drain current changes. In other words, the drive current of the light-emitting component changes. This causes an abnormal gray scale displayed by the light-emitting component. For example, if the drain current of the driving transistor decreases, the drive current of the light-emitting component decreases, and the gray scale displayed by the light-emitting component also decreases.

Therefore, it is necessary to compensate brightness of the light-emitting component when the driving transistor cannot reach the ideal state. Because the drain current of the driving transistor decreases when the drain source voltage of the driving transistor is adjusted to the lowest saturation voltage, the drive current of the light-emitting component decreases and the displayed gray scale decreases. The brightness compensation is to compensate a gray scale loss caused by reduction of the drive current of the light-emitting component.

It should be understood that in some possible implementation, the processor sends a control instruction to the display assembly to enable the display assembly to adjust a working voltage of the display driver circuit to the target working voltage. The voltage adjustment value here is mainly caused by the drain source voltage of the driving transistor being set to the lowest saturation voltage. Generally, the drive current and the drive voltage of the light-emitting component do not change due to adjustment of the working voltage of the display driver circuit, but the driving transistor cannot reach the ideal state. When the drain source voltage is adjusted to the lowest saturation voltage, the outputted drain current decreases. Therefore, brightness compensation may also be considered as compensation for the gray scale loss of the light-emitting component caused by reduction of the drain current outputted by the driving transistor.

Figure 18:
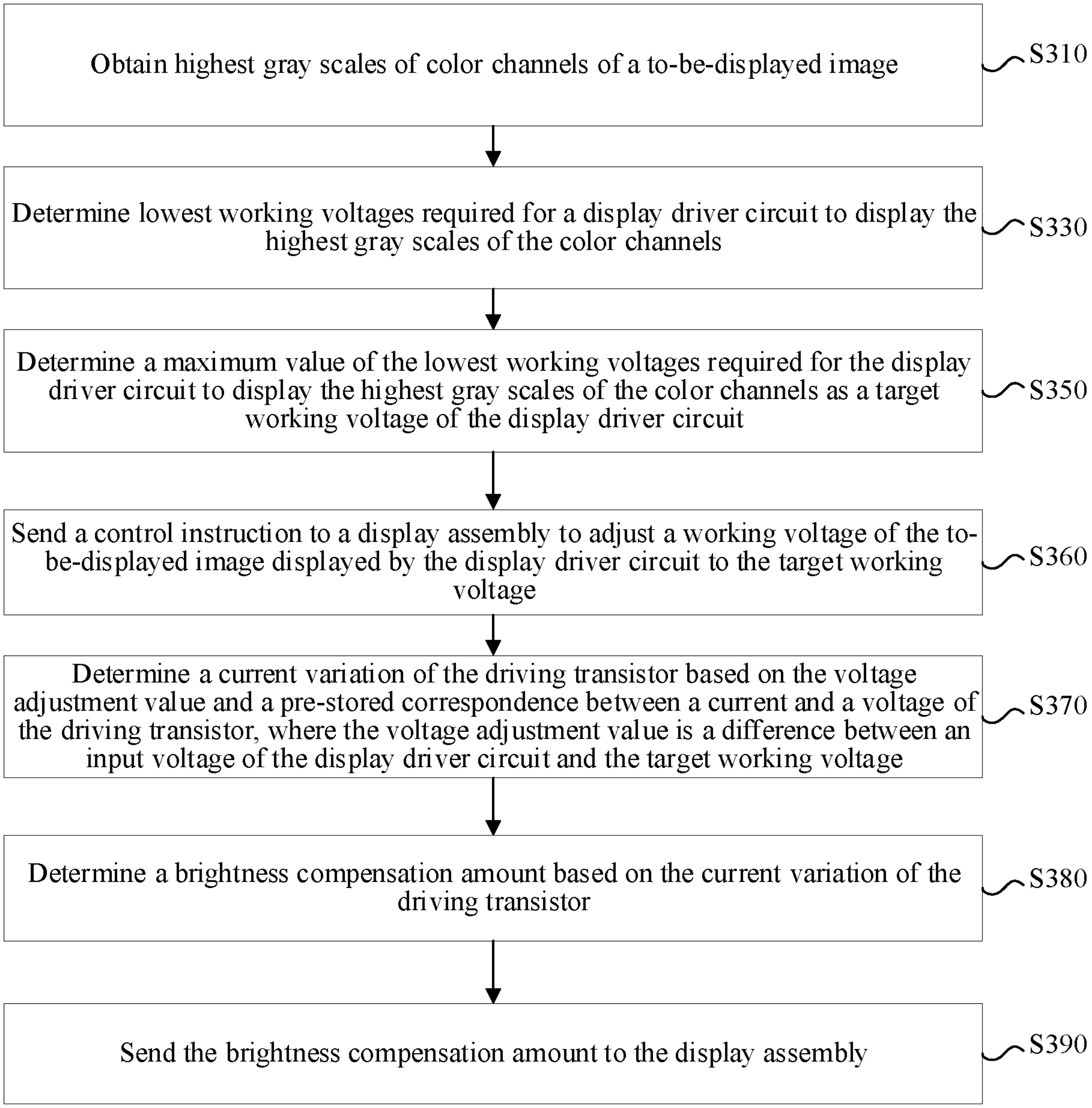
FIG. 18 is a schematic flowchart of another voltage regulation method according to an embodiment of this application.

For example, refer to FIG. 18. The voltage regulation method provided in this embodiment of this application further includes:

S370: Determine a current variation of the driving transistor based on the voltage adjustment value and the pre-stored correspondence between the current and the voltage of the driving transistor.

S380: Determine a brightness compensation amount based on the current variation of the driving transistor.

In the foregoing example, to reduce power consumption, the voltage of the driving transistor is adjusted to the lowest saturation voltage. However, because the driving transistor may not reach the ideal state, reduction of the voltage of the driving transistor causes reduction of the outputted current. In a possible implementation, the current variation of the driving transistor may be determined based on voltage variation of the driving transistor and the pre-stored correspondence between the current and the voltage of the driving transistor. The voltage adjustment value is a difference between an input voltage of the display driver circuit and the target working voltage. Because the target working voltage of the display driver circuit is mainly the variation caused by adjustment of the drain source voltage of the driving transistor to the lowest saturation voltage, an adjustment value of the working voltage of the display driver circuit may be approximately equivalent to variation caused by the drain source voltage of the driving transistor. Therefore, the current variation ΔI of the driving transistor may be determined based on the voltage adjustment value and the pre-stored correspondence between the current and the voltage of the driving transistor.

Figure 17:
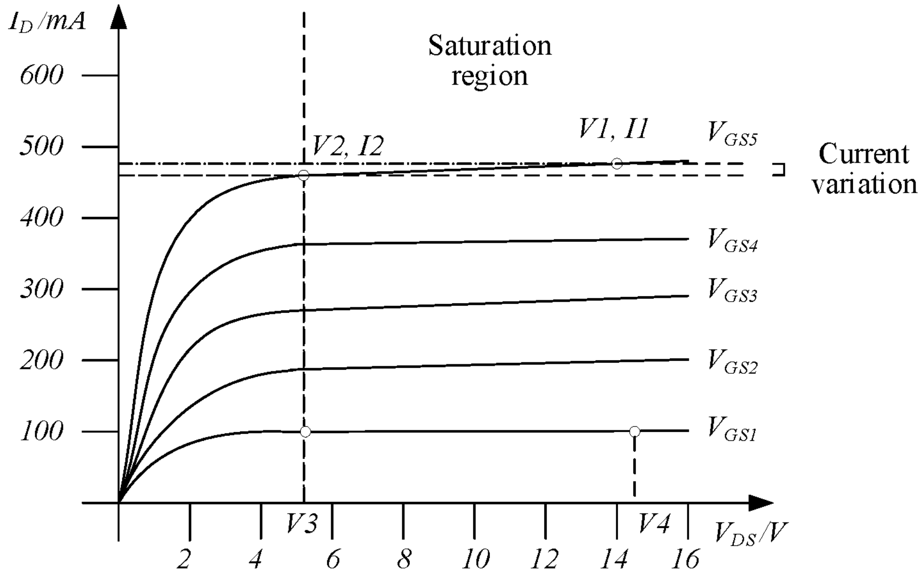
FIG. 17 is a schematic diagram of a relationship between a current and a voltage of another driving transistor according to an embodiment of this application.

For example, with reference to FIG. 17, when the voltage of the driving transistor is reduced from V1 to V2, the current outputted by the driving transistor is decreased from I1 to I2, and the current variation $\Delta I = I1 - I2$.

In a possible implementation, after the voltage variation of the driving transistor is determined, the current variation may be calculated based on the slope of the relationship curve of the current and the voltage of the driving transistor.

For example, if the slope of the relationship curve of the current and the voltage of the driving transistor is k, and the voltage adjustment value is ΔV, $\Delta I = k \times \Delta V$.

After the current variation of the driving transistor is determined, a brightness compensation amount is determined based on the current variation of the driving transistor. In a possible implementation, the current variation may be determined as the brightness compensation amount. In another possible implementation, the current variation may alternatively be converted into the brightness compensation amount according to a set rule.

For example, the display assembly performs brightness compensation by controlling a duty cycle of an EM signal of the display driver circuit. For example, if the current of the driving transistor is decreased by 5%, the display assembly may increase the duty cycle of the EM signal by 5% when performing the brightness compensation.

After the brightness compensation amount is determined, the voltage regulation method further includes:

S390: Send the brightness compensation amount to the display assembly.

For example, the brightness compensation amount is sent to the display assembly, and the display assembly compensates the brightness displayed by the light-emitting component based on the brightness compensation amount.

In the foregoing examples, a display mode of the RGM mode is used as an example. Therefore, it is necessary to first determine highest gray scales of red, green, and blue channels of the to-be-displayed image, then determine lowest working voltages required for the display driver circuit to display the highest gray scales of the colors, use a maximum value of the lowest working voltages corresponding to the colors as a target working voltage, and adjust the working voltage of the display driver circuit when the to-be-displayed image is displayed based on the target working voltage. In this way, when the highest gray scale of the to-be-displayed image is lower than the highest gray scale that can be displayed by the light-emitting component, power consumption of the display driver circuit can be reduced, thereby reducing power consumption of a whole display screen or display assembly. In some other possible implementations, the display assembly may alternatively be displayed in another mode, such as an RGBW mode. In this way, it is necessary to determine a target working voltage of the display driver circuit based on highest gray scales of red, green, blue, and white channels of a displayed image, or the display assembly may display in another mode. This is not limited in embodiments of this application.

An embodiment of this application provides a chip. The chip is used in a terminal device, for example, may be used in any one of the terminal devices in FIG. 1 or FIG. 5 to FIG. 8. The chip includes one or more processors. The processors are configured to execute computer program instructions to enable the terminal device to perform the voltage regulation method according to the foregoing embodiments of this application.

An embodiment of this application further provides a computer-readable storage medium that has a computer program stored thereon. When the computer program is executed by a processor of a terminal device, the terminal device is enabled to perform the voltage regulation method according to the foregoing embodiments of this application.

What is described above is merely specific embodiments of this application, but the protection scope of this application is not limited to such embodiments. Any variation or replacement within the technical scope disclosed herein still fall within the protection scope of this application. Therefore, the protection scope of this application shall be subject to the protection scope of the claims.

The invention claimed is:

1. A voltage regulation method, applied to a processor of a terminal device, wherein the terminal device further comprises a display assembly, the display assembly comprises a display driver circuit, and the method comprises:

obtaining highest gray scales of color channels of a to-be-displayed image;

determining lowest working voltages required for the display driver circuit to display the highest gray scales of the color channels;

determining a maximum value of the lowest working voltages required for the display driver circuit to display the highest gray scales of the color channels as a target working voltage of the display driver circuit;

determining a current variation of a driving transistor based on a voltage adjustment value and a pre-stored correspondence between a current and a voltage of the driving transistor, wherein the voltage adjustment value is a difference between an input voltage of the display driver circuit and the target working voltage;

determining a brightness compensation amount based on the current variation; and sending the brightness compensation amount to the display assembly.

2. The voltage regulation method according to claim 1, wherein the display driver circuit comprises a driving transistor and a light-emitting component, and the driving transistor is configured to provide a drive current for the light-emitting component; and the determining lowest working voltages required for the display driver circuit to display the highest gray scales of the color channels comprises:

determining, based on a pre-stored correspondence between a gray scale of the light-emitting component with each color and the drive current as well as a correspondence between the drive current and a drive voltage, drive currents and drive voltages that are required for the light-emitting component to display the highest gray scales of the color channels;

determining, based on the pre-stored correspondence between the current and the voltage of the driving transistor, a lowest saturation voltage when the driving transistor outputs the drive current; and determining a sum of the drive voltages required for the light-emitting component to display the highest gray scales of the color channels and the lowest saturation voltage as the lowest working voltages required for displaying the highest gray scales of the color channels.

3. The voltage regulation method according to claim 2, wherein the determining, based on the pre-stored correspondence between the current and the voltage of the driving transistor, a lowest saturation voltage when the driving transistor outputs the drive current comprises:

determining, based on the pre-stored correspondence between the current and the voltage of the driving transistor, when the driving transistor works in a saturation region, a lowest voltage corresponding to an output current that is the drive current as the lowest saturation voltage of the driving transistor.

4. The voltage regulation method according to claim 1, wherein the method further comprises:

sending a control instruction to the display assembly to adjust a working voltage of the to-be-displayed image displayed by the display driver circuit to the target working voltage.

5. The voltage regulation method according to claim 4, wherein the control instruction comprises a voltage adjustment value, wherein the voltage adjustment value is a difference between an input voltage of the display driver circuit and the target working voltage; or the control instruction comprises the target working voltage.

6. The voltage regulation method according to claim 1, wherein the obtaining highest gray scales of color channels of a to-be-displayed image comprises:

obtaining gray scales of color channels of each pixel in the to-be-displayed image; and using a maximum value of gray scales of a same color channel of all pixels in the to-be-displayed image as a highest gray scale of this channel.

7. A terminal device, comprising:

a display assembly and one or more processors, wherein the one or more processors are connected to the display assembly, and the display assembly comprises a display driver circuit, and the one or more processors are configured to execute computer program instructions to perform operations comprising:

obtaining highest gray scales of color channels of a to-be-displayed image;

determining lowest working voltages required for the display driver circuit to display the highest gray scales of the color channels;

determining a maximum value of the lowest working voltages required for the display driver circuit to display the highest gray scales of the color channels as a target working voltage of the display driver circuit;

determining a current variation of a driving transistor based on a voltage adjustment value and a pre-stored correspondence between a current and a voltage of the driving transistor, wherein the voltage adjustment value is a difference between an input voltage of the display driver circuit and the target working voltage;

determining a brightness compensation amount based on the current variation; and sending the brightness compensation amount to the display assembly.

8. The terminal device according to claim 7, wherein the display driver circuit comprises a driving transistor and a light-emitting component, and the driving transistor is configured to provide a drive current for the light-emitting component; and the determining lowest working voltages required for the display driver circuit to display the highest gray scales of the color channels comprises:

determining, based on a pre-stored correspondence between a gray scale of the light-emitting component with each color and the drive current as well as a correspondence between the drive current and a drive voltage, drive currents and drive voltages that are required for the light-emitting component to display the highest gray scales of the color channels;

determining, based on the pre-stored correspondence between the current and the voltage of the driving transistor, a lowest saturation voltage when the driving transistor outputs the drive current; and determining a sum of the drive voltages required for the light-emitting component to display the highest gray scales of the color channels and the lowest saturation voltage as the lowest working voltages required for displaying the highest gray scales of the color channels.

9. The terminal device according to claim 8, wherein the determining, based on the pre-stored correspondence between the current and the voltage of the driving transistor, a lowest saturation voltage when the driving transistor outputs the drive current comprises:

determining, based on the pre-stored correspondence between the current and the voltage of the driving transistor, when the driving transistor works in a saturation region, a lowest voltage corresponding to an output current that is the drive current as the lowest saturation voltage of the driving transistor.

10. The terminal device according to claim 7, wherein the operations comprise:

sending a control instruction to the display assembly to adjust a working voltage of the to-be-displayed image displayed by the display driver circuit to the target working voltage.

11. The terminal device according to claim 10, wherein the control instruction comprises a voltage adjustment value, wherein the voltage adjustment value is a difference between an input voltage of the display driver circuit and the target working voltage; or the control instruction comprises the target working voltage.

12. The terminal device according to claim 7, wherein the obtaining highest gray scales of color channels of a to-be-displayed image comprises:

obtaining gray scales of color channels of each pixel in the to-be-displayed image; and using a maximum value of gray scales of a same color channel of all pixels in the to-be-displayed image as a highest gray scale of this channel.

13. A non-transitory computer-readable storage medium, wherein the non-transitory computer-readable storage medium has a computer program stored thereon, and when the computer program is executed by a processor, a terminal device comprising a display driver circuit and a display assembly is enabled to perform operations comprising:

obtaining highest gray scales of color channels of a to-be-displayed image;

determining lowest working voltages required for the display driver circuit to display the highest gray scales of the color channels;

determining a maximum value of the lowest working voltages required for the display driver circuit to display the highest gray scales of the color channels as a target working voltage of the display driver circuit;

determining a current variation of a driving transistor based on a voltage adjustment value and a pre-stored correspondence between a current and a voltage of the driving transistor, wherein the voltage adjustment value is a difference between an input voltage of the display driver circuit and the target working voltage;

determining a brightness compensation amount based on the current variation; and sending the brightness compensation amount to the display assembly.

14. The non-transitory computer-readable storage medium according to claim 13, wherein the display driver circuit comprises a driving transistor and a light-emitting component, and the driving transistor is configured to provide a drive current for the light-emitting component; and the determining lowest working voltages required for the display driver circuit to display the highest gray scales of the color channels comprises:

determining, based on a pre-stored correspondence between a gray scale of the light-emitting component with each color and the drive current as well as a correspondence between the drive current and a drive voltage, drive currents and drive voltages that are required for the light-emitting component to display the highest gray scales of the color channels;

determining, based on the pre-stored correspondence between the current and the voltage of the driving transistor, a lowest saturation voltage when the driving transistor outputs the drive current; and determining a sum of the drive voltages required for the light-emitting component to display the highest gray scales of the color channels and the lowest saturation voltage as the lowest working voltages required for displaying the highest gray scales of the color channels.

15. The non-transitory computer-readable storage medium according to claim 14, wherein the determining, based on the pre-stored correspondence between the current and the voltage of the driving transistor, a lowest saturation voltage when the driving transistor outputs the drive current comprises:

determining, based on the pre-stored correspondence between the current and the voltage of the driving transistor, when the driving transistor works in a saturation region, a lowest voltage corresponding to an output current that is the drive current as the lowest saturation voltage of the driving transistor.

16. The non-transitory computer-readable storage medium according to claim 13, wherein the operations comprise:

sending a control instruction to the display assembly to adjust a working voltage of the to-be-displayed image displayed by the display driver circuit to the target working voltage.

17. The non-transitory computer-readable storage medium according to claim 16, wherein the control instruction comprises a voltage adjustment value, wherein the voltage adjustment value is a difference between an input voltage of the display driver circuit and the target working voltage; or the control instruction comprises the target working voltage.

18. The non-transitory computer-readable storage medium according to claim 13, wherein the obtaining highest gray scales of color channels of a to-be-displayed image comprises:

obtaining gray scales of color channels of each pixel in the to-be-displayed image; and using a maximum value of gray scales of a same color channel of all pixels in the to-be-displayed image as a highest gray scale of this channel.

* * * * *